US00RE50649E

(19) United States
(12) Reissued Patent
Disch et al.

(10) Patent Number: US RE50,649 E
(45) **Date of Reissued Patent: *Oct. 21, 2025**

(54) DEVICE AND METHOD FOR MANIPULATING AN AUDIO SIGNAL

(71) Applicant: Fraunhofer-Gesellschaft zur Foerderung der angewandten Forschung e.V., Munich (DE)

(72) Inventors: Sascha Disch, Fuerth (DE); Frederik Nagel, Nuremberg (DE); Max Neuendorf, Nuremberg (DE); Christian Helmrich, Erlangen (DE); Dominik Zorn, Nuremberg (DE)

(73) Assignee: Fraunhofer-Gesellschaft zur Foerderung der angewandten Forschung e.V., Munich (DE)

( * ) Notice: This patent is subject to a terminal disclaimer.

(21) Appl. No.: 17/853,450

(22) Filed: Jun. 29, 2022

Related U.S. Patent Documents

Reissue of:
(64) Patent No.: 8,837,750
Issued: Sep. 16, 2014
Appl. No.: 13/240,679
Filed: Sep. 22, 2011

U.S. Applications:
(60) Division of application No. 17/851,587, filed on Jun. 28, 2022, now Pat. No. Re. 50,341, which is an (Continued)

(30) Foreign Application Priority Data

Oct. 15, 2009 (EP) ..... 09013051

(51) Int. Cl.
*G10L 19/025* (2013.01)
*G10L 21/007* (2013.01)
*G10L 21/038* (2013.01)

(52) U.S. Cl.
CPC ..... *G10L 19/025* (2013.01); *G10L 21/007* (2013.01); *G10L 21/038* (2013.01)

(58) Field of Classification Search
CPC .... G10L 21/007; G10L 21/038; G10L 19/025
See application file for complete search history.

(56) References Cited

U.S. PATENT DOCUMENTS 4,366,349 A * 12/1982 Adelman ..... 381/316
5,455,888 A 10/1995 Iyengar et al.
(Continued)

FOREIGN PATENT DOCUMENTS

CN 1055830 10/1991
CN 1055830 A 10/1991
(Continued)

OTHER PUBLICATIONS

Aarts , et al., "A Unified Approach to Low-and High-Frequency Bandwidth Extension", AES Convention Paper 5921, Presented at the 115th Convention, New York, USA, Oct. 2003, 16 pages.
(Continued)

*Primary Examiner* — Charles R Craver
(74) *Attorney, Agent, or Firm* — Perkins Coie LLP; Michael A. Glenn

(57) ABSTRACT

A device and method for manipulating an audio signal includes a windower for generating a plurality of consecutive blocks of audio samples, the plurality of consecutive blocks including at least one padded block of audio samples, the padded block having padded values and audio signal values, a first converter for converting the padded block into a spectral representation having spectral values, a phase modifier for modifying phases of the spectral values to obtain a modified spectral representation and a second converter for converting the modified spectral representation into a modified time domain audio signal.

9 Claims, 14 Drawing Sheets

Related U.S. Application Data application for the reissue of Pat. No. 8,837,750, which is a continuation of application No. PCT/EP2010/053720, filed on Mar. 22, 2010.

(60) Provisional application No. 61/163,609, filed on Mar. 26, 2009.

(56) References Cited

U.S. PATENT DOCUMENTS

| | | | | |
|---|---|---|---|---|
| 5,950,153 | A | 9/1999 | Ohmori et al. | |
| 6,266,003 | B1 | 7/2001 | Hoek | |
| 6,549,884 | B1 | 4/2003 | Laroche et al. | |
| 6,868,377 | B1 | 3/2005 | Laroche | |
| 6,895,375 | B2 | 5/2005 | Malah et al. | |
| 9,159,337 | B2 | 10/2015 | Villemoes et al. | |
| 2002/0173948 | A1* | 11/2002 | Hilpert et al. | 704/200.1 |
| 2005/0010397 | A1 | 1/2005 | Sakurai et al. | |
| 2006/0253209 | A1* | 11/2006 | Hersbach et al. | 700/94 |
| 2007/0140499 | A1 | 6/2007 | Davis et al. | |
| 2007/0255559 | A1 | 11/2007 | Gao et al. | |
| 2012/0010880 | A1 | 1/2012 | Nagel et al. | |
| 2012/0158409 | A1 | 6/2012 | Nagel et al. | |
| 2012/0281859 | A1 | 11/2012 | Villemoes et al. | |
| 2013/0044896 | A1 | 2/2013 | Ekstrand | |
| 2013/0339037 | A1 | 12/2013 | Liljeryd et al. | |

FOREIGN PATENT DOCUMENTS

| | | | |
|---|---|---|---|
| JP | 2011-117595 | | 6/2011 |
| RU | 2262748 | | 9/2000 |
| RU | 2251795 | | 5/2005 |
| RU | 2251795 | C2 | 5/2005 |
| RU | 2262748 | C2 | 10/2005 |
| WO | 2007016107 | A2 | 2/2007 |
| WO | WO 2007/016107 | | 2/2007 |
| WO | WO-2009/034167 | | 3/2009 |
| WO | 099116769 | | 9/2009 |
| WO | WO-2009116769 | | 9/2009 |

OTHER PUBLICATIONS

Dietz, Martin , et al., "Spectral Band Replication, a Novel Approach in Audio Coding", Engineering Society Convention 121, Audio Engineering Society Paper 5553, May 10, 2002, pp. 1-8.

Faller , et al., "Efficient Representation of Spatial Audio Using Perceptual Parametrization", Applications of Signal Processing to Audio and Acoutics 2001, IEEE Workshop, Oct. 2001, pp. 199-202, Oct. 21, 2001, pp. 199-202.

ISO/IEC 14496-3 , "Information technology—Coding of audio-visual objects—Part 3: Audio, Amendment 1: Bandwidth extensions".

Makhoul, J. , "Spectral Analysis of Speech by Linear Prediction", IEEE Trans. Audio Electroacoust., AU-21(3) (1973). pp. 140-148, Jun. 1, 1973, 140-148.

Dietz, M., et al., "Spectral Band Replication, a novel approach in patent audio coding" AES, 112th Convention, Paper 5553, Munich, May 2002.

Disch, S., and Edler, B. "An Amplitude- and Frequency-Modulation Vocoder for Audio Processing" Proc. 11th International Conference on Digital Audio Effects, Espoo, Sep. 2008.

Faller, C, and Baumgarte, F. "Efficient Representation of Spatial Audio Using Perceptual Parametrization" IEEE Workshop on Applications of Signal Processing to Audio and Acoustics, Piscataway, 2001.

Herre, J., et al., "MP3 Surround: Efficient and Compatible Coding of Multi-Channel Audio", AES, 116th Convention, Paper 6049, Berlin, May 2004.

ISO/IEG 14496-3:2001 FDAM 1 "Information technology—Coding of audio-visual objects—Part 3: Audio, Amendment 1: Bandwidth extensions".

Laroche, L., and Dolson, M. et al., "Improved Phase Vocoder Time-Scale Modification of Audio", IEEE Trans. Speech, Audio Processing, 7(3) (1999), pp. 323-332.

Larsen, E., and AARTS, R.M. "Audio Bandwidth Extension—Application of Psychoacoustics, Signal Processing and Loudspeaker Design" John Wiley & Sons, 2004.

Larsen, E.,et al., "Efficient high-frequency bandwidth extension of music and speech", AES, 112th Convention, Paper 5627, Munich, May 2002.

Meltzer, S., et al., SBR enhanced audio codecs for digital broadcasting such as "Digital Radio Mondiale (DRM)", AES, 112th Convention, Paper 5559, Munich, May 2002., May 10, 2002.

Nagel, F., and Disch, S. "A Harmonic Bandwidth Extension Method for Audio Codecs" IEEE ICASSP International Conference on Acousltics, Speech and Signal Processing, Taipei, Apr. 2009.

Nagel, F., et al. "A Phase Vocoder Driven Bandwidth Extension Method with Novel Transient Handling for Audio Codecs" AES, 126th Convention, Munich, May 2009.

Puckette, M. "Phase-locked Vocoder" IEEE ASSP Workshop on Applications of Signal Processing to Audio and Acoustics, Mohonk, 1995.

Röebel, A. , "Transient detection and preservation in the phase vocoder", citeseer.ist.psu.edu/679246.html.

Ziegler, T., et al. Enhancing mp3 with SBR: Features and Capabilities of the new mp3PRO Algorithm AES, 112th Convention, Paper 5560, Munich, May 2002.

* cited by examiner

DEVICE AND METHOD FOR MANIPULATING AN AUDIO SIGNAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

*More than one reissue application has been filed for the reissue of U.S. Pat. No. 8,837,750, the first being reissue application Ser. No. 17/851,587, filed Jun. 28, 2022, now U.S. Pat. No. RE50,341; additional reissue applications include pending application Ser. Nos. 17/852,051, 17/852,122, 17/852,157, and 17/852,187, 17/853,398, 17/853,425, and 17/853,450 (the subject application) as well as now-issued reissue application Ser. Nos. 17/853,303 (now U.S. Pat. No. RE50,493) and 17/853,360 (now U.S. Pat. No. RE50,410), all of which were filed Jun. 28, 2022 as divisional reissues of reissue application Ser. No. 17/851,587.*

This application is a *divisional reissue application of Ser. No. 17/851,587, filed Jun. 28, 2022, now U.S. Pat. No. RE50,341, and is also a reissue application of issued U.S. Pat. No. 8,837,750, issued Sep. 16, 2014, which is a* continuation of [copending] International Application No. PCT/EP2010/053720, filed Mar. 22, 2010, which is incorporated herein by reference in its entirety, and additionally claims priority from U.S. Patent Application No. 61/163,609, filed Mar. 26, 2009, and European Patent Application No. 09013051.9 filed Oct. 15, 2009, both of which are incorporated herein by reference in their entirety.

BACKGROUND OF THE INVENTION

The present invention relates to a scheme for manipulating an audio signal by modifying phases of spectral values of the audio signal such as within a bandwidth extension (BWE) scheme.

Storage or transmission of audio signals is often subject to strict bitrate constraints. In the past, coders were forced to drastically reduce the transmitted audio bandwidth when only a very low bitrate was available. Modern audio codecs are nowadays able to code wide-band signals by using bandwidth extension methods, as described in M. Dietz, L. Liljeryd, K. Kjörling and O. Kunz, "Spectral Band Replication, a novel approach in audio coding," in 112th AES Convention, Munich, May 2002; S. Meltzer, R. Böhm and F. Henn, "SBR enhanced audio codecs for digital broadcasting such as "Digital Radio Mondiale" (DRM)," in 112th AES Convention, Munich, May 2002; T. Ziegler, A. Ehret, P. Ekstrand and M. Lutzky, "Enhancing mp3 with SBR: Features and Capabilities of the new mp3PRO Algorithm," in 112th AES Convention, Munich, May 2002; International Standard ISO/IEC 14496-3:2001/FPDAM 1, "Bandwidth Extension," ISO/IEC, 2002. Speech bandwidth extension method and apparatus Vasu Iyengar et al.; E. Larsen, R. M. Aarts, and M. Danessis. Efficient high-frequency bandwidth extension of music and speech. In AES 112th Convention, Munich, Germany, May 2002; R. M. Aarts, E. Larsen, and O. Ouweltjes. A unified approach to low- and high frequency bandwidth extension. In AES 115th Convention, New York, USA, October 2003; K. Käyhkö. A Robust Wideband Enhancement for Narrowband Speech Signal. Research Report, Helsinki University of Technology, Laboratory of Acoustics and Audio Signal Processing, 2001; E. Larsen and R. M. Aarts. Audio Bandwidth Extension—Application to psychoacoustics, Signal Processing and Loudspeaker Design. John Wiley & Sons, Ltd, 2004; E. Larsen, R. M. Aarts, and M. Danessis. Efficient high-frequency bandwidth extension of music and speech. In AES 112th Convention, Munich, Germany, May 2002; J. Makhoul. Spectral Analysis of Speech by Linear Prediction. IEEE Transactions on Audio and Electroacoustics, AU-21(3), June 1973; U.S. patent application Ser. No. 08/951,029, Ohmori, et al. Audio band width extending system and method and U.S. Pat. No. 6,895,375, Malah, D & Cox, R. V.: System for bandwidth extension of Narrow-band speech. These algorithms rely on a parametric representation of the high-frequency content (HF), which is generated from the waveform coded low-frequency part (LF) of the decoded signal by means of transposition into the HF spectral region ("patching") and application of a parameter driven post processing.

Lately, a new algorithm which employs phase vocoders as, for example, described in M. Puckette. Phase-locked Vocoder. IEEE ASSP Conference on Applications of Signal Processing to Audio and Acoustics, Mohonk 1995.", Röbel, A.: Transient detection and preservation in the phase vocoder; citeseer.ist.psu.edu/679246.html; Laroche L., Dolson M.: "Improved phase vocoder timescale modification of audio", IEEE Trans. Speech and Audio Processing, vol. 7, no. 3, pp. 323-332 and U.S. Pat. No. 6,549,884 Laroche, J. & Dolson, M.: Phase-vocoder pitch-shifting for the patch generation, has been presented in Frederik Nagel, Sascha Disch, "A harmonic bandwidth extension method for audio codecs," ICASSP International Conference on Acoustics, Speech and Signal Processing, IEEE CNF, Taipei, Taiwan, April 2009. However, this method called "harmonic bandwidth extension" (HBE) is prone to quality degradations of transients contained in the audio signal, as described in Frederik Nagel, Sascha Disch, Nikolaus Rettelbach, "A phase vocoder driven bandwidth extension method with novel transient handling for audio codecs," 126th AES Convention, Munich, Germany, May 2009, since vertical coherence over sub-bands is not guaranteed to be preserved in the standard phase vocoder algorithm and, moreover, the re-calculation of the Discrete Fourier Transform (DFT) phases has to be performed on isolated time blocks of a transform implicitly assuming circular periodicity.

It is known that specifically two kinds of artifacts due to the block based phase vocoder processing can be observed. These, in particular, are dispersion of the waveform and temporal aliasing due to temporal cyclic convolution effects of the signal due to the application of newly calculated phases.

In other words, because of the application of a phase modification on the spectral values of the audio signal in the BWE algorithm, a transient contained in a block of the audio signal may be wrapped around the block, i.e. cyclically convolved back into the block. This results in temporal aliasing and, consequently, leads to a degradation of the audio signal.

Therefore, methods for a special treatment for signal parts containing transients should be employed. However, especially since the BWE algorithm is performed on the decoder side of a codec chain, computational complexity is a serious issue. Accordingly, measures against the just-mentioned audio signal degradation should advantageously not come at the price of a largely increased computational complexity.

SUMMARY

According to an embodiment, an apparatus for manipulating an audio signal may have: a windower for generating a plurality of consecutive blocks of audio samples, the plurality of consecutive blocks having at least one padded block of audio samples, the padded block having padded values and audio signal values; a first converter for converting the padded block into a spectral representation having spectral values; a phase modifier for modifying phases of the spectral values to achieve a modified spectral representation; and a second converter for converting the modified spectral representation into a modified time domain audio signal.

According to another embodiment, a method for manipulating an audio signal may have the steps of generating a plurality of consecutive blocks of audio samples, the plurality of consecutive blocks having at least one padded block of audio samples, the padded block having padded values and audio signal values; converting the padded block into a spectral representation having spectral values; modifying phases of the spectral values to achieve a modified spectral representation; and converting the modified spectral representation into a modified time domain audio signal.

Another embodiment may have a computer program having a program code for performing the method for manipulating an audio signal, which method may have the steps of: generating a plurality of consecutive blocks of audio samples, the plurality of consecutive blocks having at least one padded block of audio samples, the padded block having padded values and audio signal values; converting the padded block into a spectral representation having spectral values; modifying phases of the spectral values to achieve a modified spectral representation; and converting the modified spectral representation into a modified time domain audio signal, when the computer program is executed on a computer.

The basic idea underlying the present invention is that the above-mentioned better trade-off can be achieved when at least one padded block of audio samples having padded values and audio signal values is generated before modifying phases of the spectral values of the padded block. By this measure, a drift of signal content to the block borders due to the phase modification and a corresponding time aliasing may be prevented from occurring or at least made less probable, and therefore the audio quality is maintained with low efforts.

The inventive concept for manipulating an audio signal is based on generating a plurality of consecutive blocks of audio samples, the plurality of consecutive blocks comprising at least one padded block of audio samples, the padded block having padded values and audio signal values. The padded block is then converted into a spectral representation having spectral values. The spectral values are then modified to obtain a modified spectral representation. Finally, the modified spectral representation is converted into a modified time domain audio signal. The range of values that was used for padding may then be removed.

According to an embodiment of the present invention, the padded block is generated by inserting padded values advantageously consisting of zero values before or after a time block.

According to an embodiment, the padded blocks are restricted to those containing a transient event, thereby restricting the additional computational complexity overhead to these events. More precisely, a block is processed, for example, in an advanced way by a BWE algorithm, when a transient event is detected in this block of the audio signal, in the form of a padded block, while another block of the audio signal is processed as a non-padded block having audio signal values only in a standard way of a BWE algorithm when the transient event is not detected in the block. By adaptively switching between standard processing and advanced processing, the average computational effort can be significantly reduced, which allows for example for a reduced processor speed and memory.

According to embodiments of the present invention, the padded values are arranged before and/or after a time block in which a transient event is detected, so that the padded block is adapted to a conversion between the time and frequency domain by a first and second converter, realized, for example, through an DFT and an IDFT processor, respectively. An advantageous solution would be to arrange the padding symmetrically surrounding the time block.

According to an embodiment, the at least one padded block is generated by appending padded values such as zero values to a block of audio samples of the audio signal. Alternatively, an analysis window function having at least one guard zone appended to a start position of the window function or an end position of the window function is used to form a padded block by applying this analysis window function to a block of audio samples of the audio signal. The window function may comprise, for example, a Hann window with guard zones.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
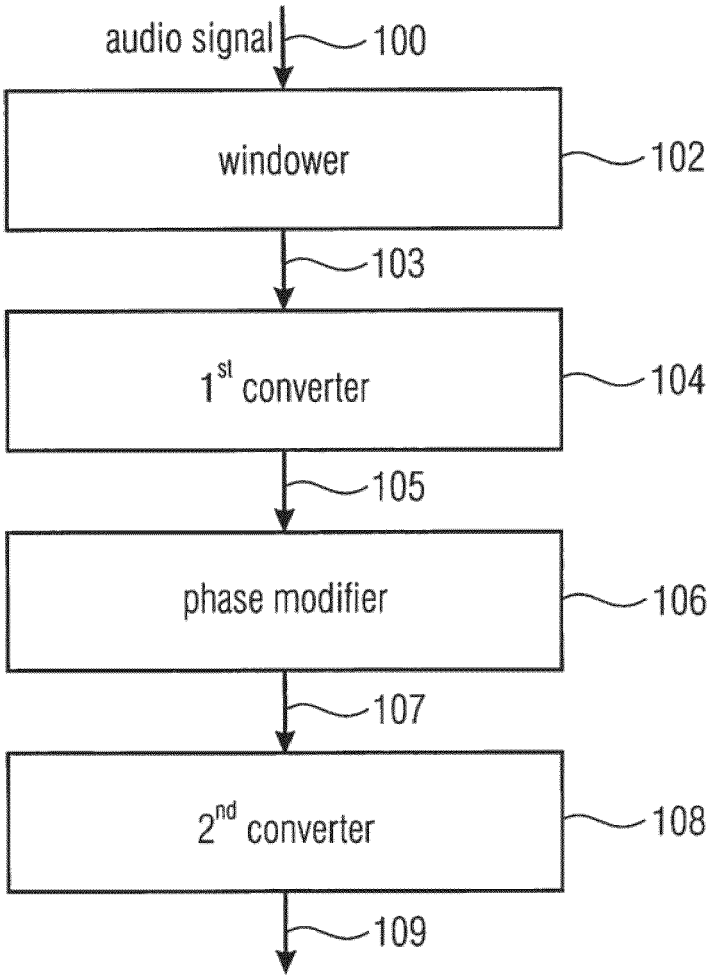
FIG. 1 shows a block diagram of an embodiment for manipulating an audio signal.

FIG. 1 illustrates an apparatus for manipulating an audio signal according to an embodiment of the present invention. The apparatus comprises a windower 102, which has an input 100 for an audio signal. The windower 102 is implemented to generate a plurality of consecutive blocks of audio samples, which comprises at least one padded block. The padded block, in particular, has padded values and audio signal values. The padded block present at an output 103 of the windower 102 is supplied to a first converter 104, which is implemented to convert the padded block 103 into a spectral representation having spectral values. The spectral values at the output 105 of the first converter 104 are then supplied to a phase modifier 106. The phase modifier 106 is implemented to modify phases of the spectral values 105 to obtain a modified spectral representation at 107. The output 107 is finally supplied to a second converter 108, which is implemented to convert the modified spectral representation 107 into a modified time domain audio signal 109. The output 109 of the second converter 108 may be connected to a further decimator, which may be used for a bandwidth extension scheme, as discussed in connection with FIGS. 2, 3 and 8.

Figure 2:
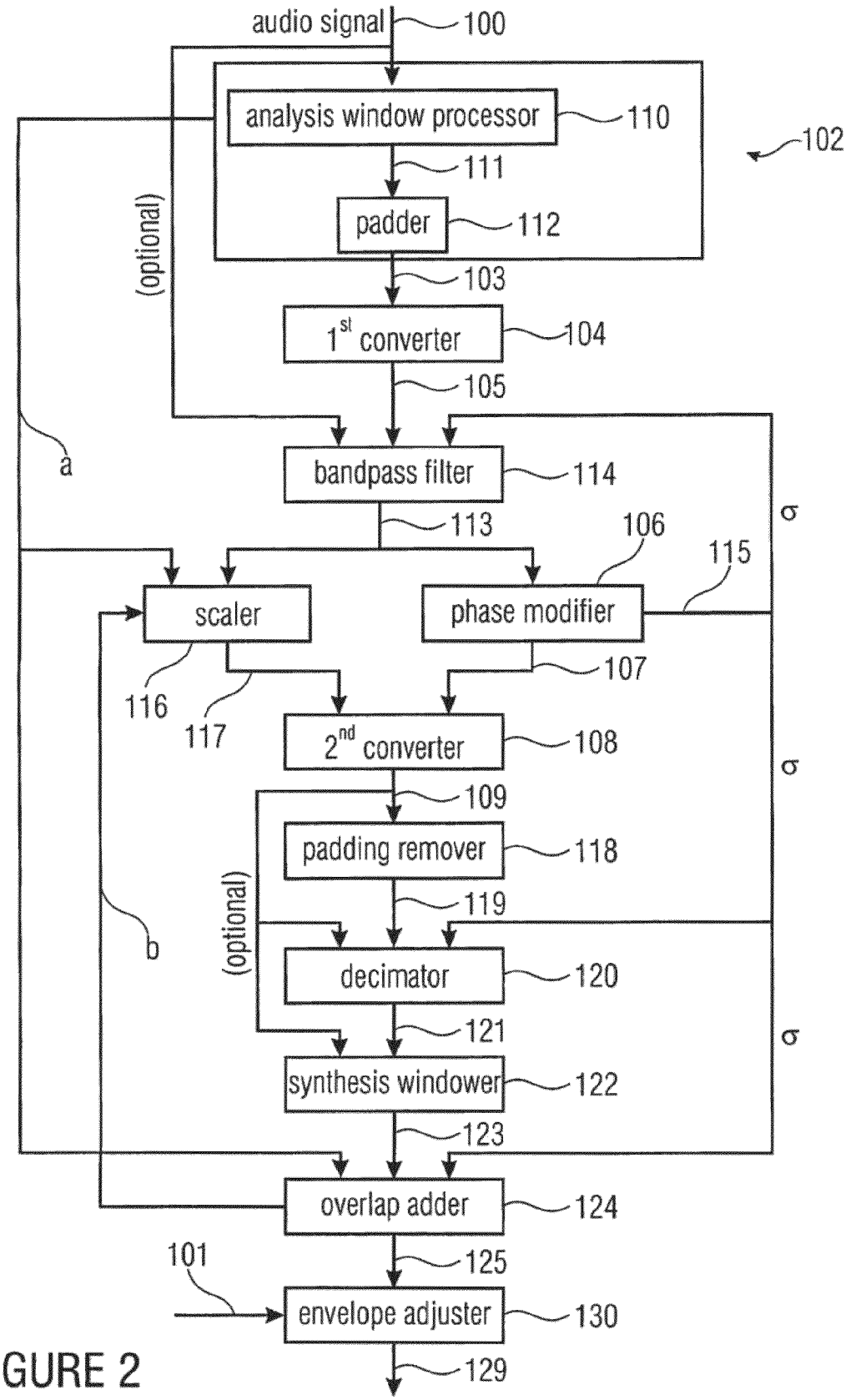
FIG. 2 shows a block diagram of an embodiment for performing a bandwidth extension using the audio signal.

FIG. 2 shows a schematic illustration of an embodiment for performing a bandwidth extension algorithm using a bandwidth extension factor (σ). Here, the audio signal 100 is fed into the windower 102, which comprises an analysis window processor 110 and a subsequent padder 112. In an embodiment, the analysis window processor 110 is implemented to generate a plurality of consecutive blocks having the same size. The output 111 of the analysis window processor 110 is further connected to the padder 112. In particular, the padder 112 is implemented to pad a block of the plurality of consecutive blocks at the output 111 of the analysis window processor 110 to obtain the padded block at the output 103 of the padder 112. Here, the padded block is obtained by inserting padded values at specified time positions before a first sample of consecutive blocks of audio samples or after a last sample of the consecutive block of audio samples. The padded block 103 is further converted by the first converter 104 to obtain a spectral representation at the output 105. Further, a bandpass filter 114 is used, which is implemented to extract the bandpass signal 113 from the spectral representation 105 or the audio signal 100. A bandpass characteristic of the bandpass filter 114 is selected such that the bandpass signal 113 is restricted to an appropriate target frequency range. Here, the bandpass filter 114 receives a bandwidth extension factor (σ) that is also present at the output 115 of a downstream phase modifier 106. In one embodiment of the present invention, a bandwidth extension factor (σ) of 2.0 is used for performing the bandwidth extension algorithm. In case that the audio signal 100 has, for example, a frequency range of 0 to 4 kHz, the bandpass filter 114 will extract the frequency range of 2 to 4 kHz, so that the bandpass signal 113 will be transformed by the subsequent BWE algorithm to a target frequency range of 4 to 8 kHz provided that, for example, the bandwidth extension factor (σ) of 2.0 is applied to select an appropriate bandpass filter 114 (see FIG. 10). The spectral representation of the bandpass signal at the output 113 of the bandpass filter 114 comprises amplitude information and phase information, which is further processed in a scaler 116 and the phase modifier 106, respectively. The scaler 116 is implemented to scale the spectral values 113 of the amplitude information by a factor, wherein the factor depends on an overlap add characteristic in that a relation of a first time distance (a) for an overlap-add applied by the windower 102 and a different time distance (b) applied by a downstream overlap adder 124 is accounted for.

Figure 11:
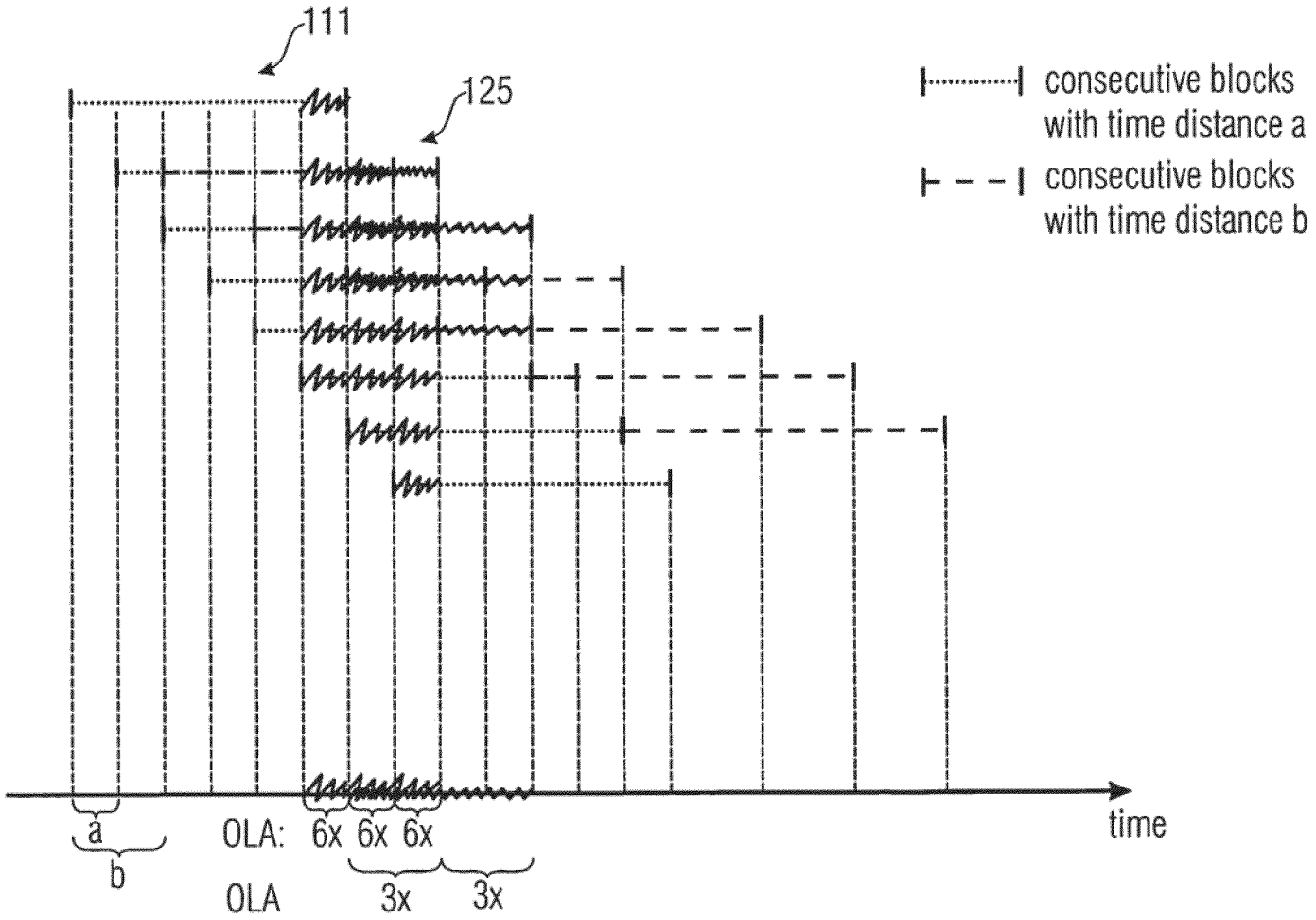
FIG. 11 shows a schematic illustration for an overlap add operation in the context of a bandwidth extension scheme.

For example, if there is an overlap-add characteristic with a sixth-fold overlap-add of consecutive blocks of audio samples having the first time distance (a), and a ratio of the second time distance (b) to the first time distance (a) of $b/\sigma=2$, then the factor of $b/a\times 1/6$ will be applied by the scaler 116 to scale the spectral values at the output 113 (see FIG. 11) assuming a rectangular analysis window.

However, this specific amplitude scaling can only be applied when a downstream decimation is performed subsequently to the overlap-add. In case the decimation is performed prior to the overlap-add, the decimation may have an effect on the amplitudes of the spectral values which generally has to be accounted for by the scaler 116.

The phase modifier 106 is configured to scale or multiply, respectively, the phases of the spectral values 113 of the band of the audio signal by the bandwidth extension factor (σ), so that at least one sample of a consecutive block of audio samples is cyclically convolved into the block.

Figure 7A:
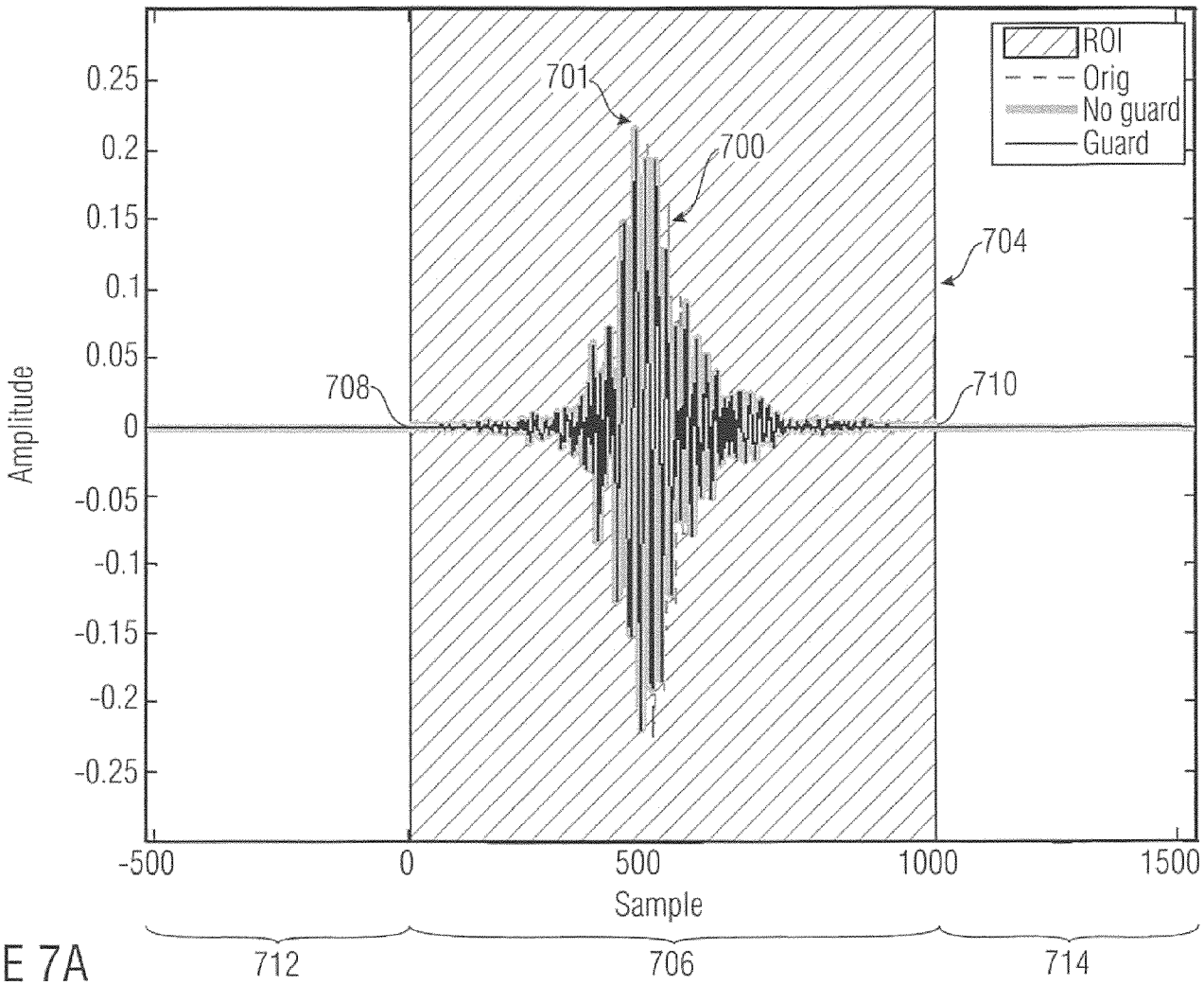
FIG. 7a shows a graph of an exemplary signal block before and after phase modification to illustrate an effect of a phase modification on a signal waveform with a transient centered in a time block.
Figure 7B:
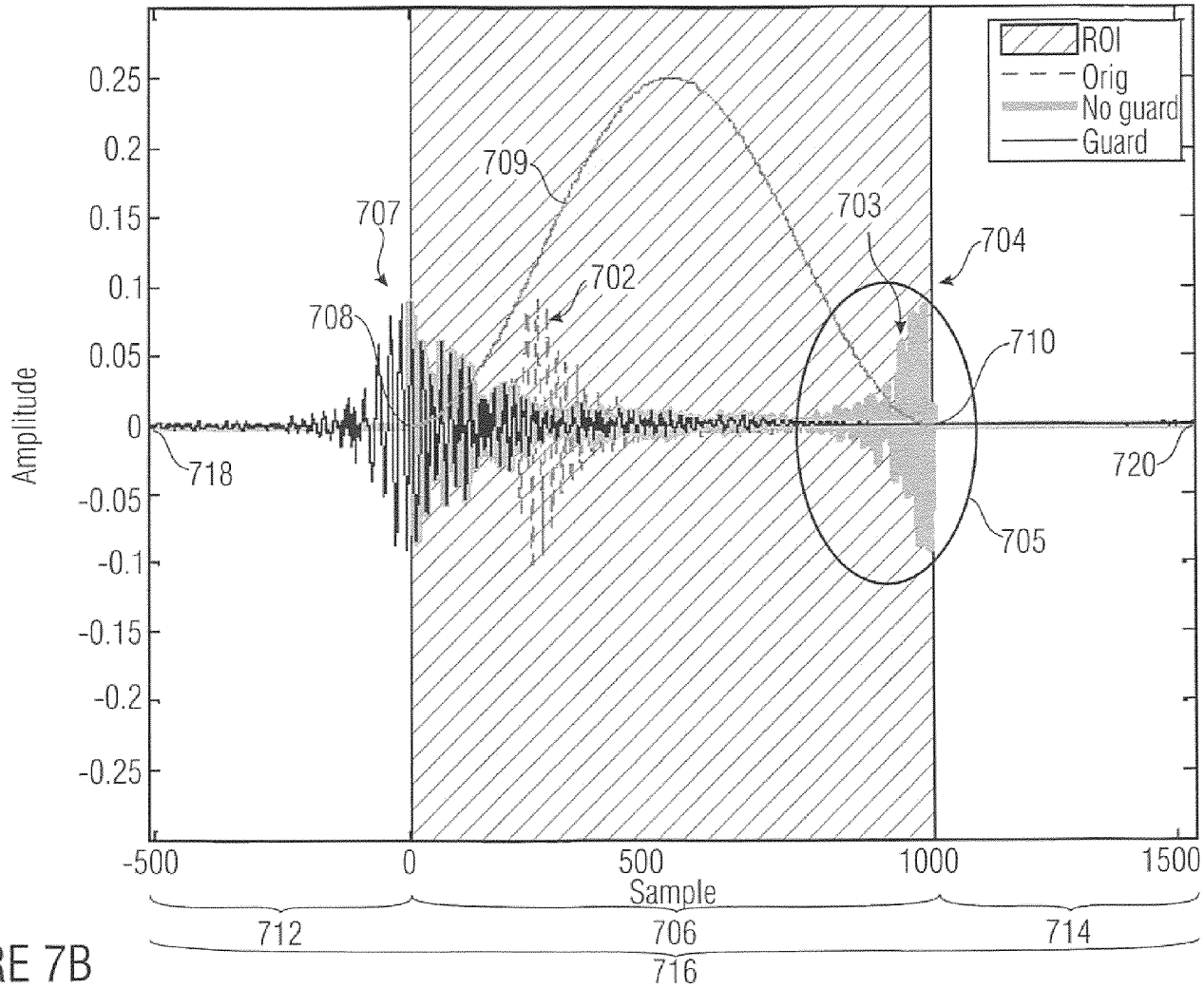
FIG. 7b shows a graph of an exemplary signal block before and after phase modification to illustrate an effect of a phase modification on a signal waveform with the transient in the vicinity of a first sample of a time block.

The effect of cyclic convolution based on a circular periodicity, which is an unwanted side effect of the conversion by the first converter 104 and the second converter 108 is shown in FIG. 7 by the example of a transient 700 centered in the analysis window 704 (FIG. 7a) and a transient 702 in the vicinity of a border of the analysis window 704 (FIG. 7b).

FIG. 7a shows the transient 700 centered in the analysis window 704, i.e. inside the consecutive block of audio samples having a sample length 706 including, for example, 1001 samples with a first sample 708 and a last sample 710 of the consecutive block. The original signal 700 is indicated by a thin dashed line. After conversion by the first converter 104 and subsequently applying a phase modification, for example, by the use of a phase vocoder to the spectrum of the original signal, the transient 700 will be shifted and cyclically convolved back into the analysis window 704 after the conversion by the second converter 108, i.e. such that the cyclically convolved transient 701 will still be located inside the analysis window 704. The cyclically convolved transient 701 is indicated by the thick line denoted by "no guard".

FIG. 7b shows the original signal containing a transient 702 close to the first sample 708 of the analysis window 704. The original signal having a transient 702 is, again, indicated by the thin dashed line. In this case, after conversion by the first converter 104 and subsequently applying the phase modification, the transient 702 will be shifted and cyclically convolved back into the analysis window 704 after the conversion by the second converter 108, so that a cyclically convolved transient 703 will be obtained, which is indicated by the thick line denoted by "no guard". Here, the cyclically convolved transient 703 is generated because at least a portion of the transient 702 is shifted before the first sample 708 of the analysis window 704 due to the phase modification, which results in circular wrapping of the cyclically convolved transient 703. In particular, as can be seen in FIG. 7b, the portion of the transient 702 that is shifted out of the analysis window 704 occurs again (portion 705) left to the last sample 710 of the analysis window 704 due to the effect of circular periodicity.

The modified spectral representation comprising the modified amplitude information from the output 117 of the scaler 116 and the modified phase information from the output 107 of the phase modifier 106 are supplied to the second converter 108, which is configured to convert the modified spectral representation into the modified time domain audio signal present at the output 109 of the second converter 108. The modified time domain audio signal at the output 109 of the second converter 108 can then be supplied to a padding remover 118. The padding remover 118 is implemented to remove those samples of the modified time domain audio signal, which correspond to the samples of the padded values inserted to generate the padded block at the output 103 of the windower 102 before the phase modification is applied by the downstream processing of the phase modifier 106. More precisely, samples are removed at those time positions of the modified time domain audio signal, which correspond to the specified time positions for which padded values are inserted prior to the phase modification.

In an embodiment of the present invention, the padded values are symmetrically inserted before the first sample 708 of the consecutive block and after the last sample 710 of the consecutive block of audio samples, as, for example, shown in FIG. 7, so that two symmetric guard zones 712, 714 are formed, enclosing the centered consecutive block having the sample length 706. In this symmetric case, the guard zones or "guard intervals" 712, 714, respectively, can advantageously be removed from the padded block by the padding remover 118 after the phase modification of the spectral values and their subsequent conversion into the modified time domain audio signal, so as to obtain the consecutive block only without the padded values at the output 119 of the padding remover 118.

In an alternative implementation, the guard intervals may not be removed by the padding remover 118 from the output 109 of the second converter 108, so that the modified time domain audio signal of the padded block will have the sample length 716 including the sample length 706 of the centered consecutive block and the sample lengths 712, 714 of the guard intervals. This signal can be further processed in subsequent processing stages down to an overlap adder 124, as shown in the block diagram of FIG. 2. In the case that the padding remover 118 is not present, this processing, including the operation on the guard intervals, can also be interpreted as an oversampling of the signal. Even though the padding remover 118 is not required in embodiments of the present invention, it is advantageous to use it as shown in FIG. 2, because the signal present at the output 119 will already have the same sample length as the original consecutive block or non-padded block, respectively, present at the output 111 of the analysis window processor 110 before the padding by the padder 112. Thus, the subsequent processing stages will be readily adapted to the signal at the output 119.

Advantageously, the modified time domain audio signal at the output 119 of the padding remover 118 is supplied to a decimator 120. The decimator 120 is advantageously implemented by a simple sample rate converter that operates using the bandwidth extension factor ($\sigma$) to obtain a decimated time domain signal at the output 121 of the decimator 120. Here, the decimation characteristic depends on the phase modification characteristic provided by the phase modifier 106 at the output 115. In an embodiment of the present invention, the bandwidth extension factor $\sigma=2$ is supplied by the phase modifier 106 via the output 115 to the decimator 120, so that every second sample will be removed from the modified time domain audio signal at the output 119, resulting in the decimated time domain signal present at the output 121.

The decimated time domain signal present at the output 121 of the decimator 120 is subsequently fed into a synthesis windower 122, which is implemented to apply a synthesis window function for example to the decimated time domain signal, wherein the synthesis window function is matched to an analysis function applied by the analysis window processor 110 of the windower 102. Here, the synthesis window function can be matched to the analysis function in such a way that applying the synthesis function compensates the effect of the analysis function. Alternatively, the synthesis windower 122 can also be implemented to operate on the modified time domain audio signal at the output 109 of the second converter 108.

The decimated and windowed time domain signal from the output 123 of the synthesis windower 122 is then supplied to an overlap adder 124. Here, the overlap adder 124 receives information about the first time distance for the overlap add operation (a) applied by the windower 102 and the bandwidth extension factor ($\sigma$) applied by the phase modifier 106 at the output 115. The overlap adder 124 applies a different time distance (b) being larger than the first time distance (a) to the decimated and windowed time domain signal.

In case the decimation is performed after the overlap-add, the condition $\sigma=b/a$ can be fulfilled in accordance with a bandwidth extension scheme. However, in the embodiment as shown in FIG. 2, the decimation is performed before the overlap-add, so that the decimation may have an effect on the above condition which generally has to be accounted for by the overlap adder 124.

Advantageously, the apparatus shown in FIG. 2 is configured for performing a BWE algorithm, which comprises a bandwidth extension factor ($\sigma$), wherein the bandwidth extension factor ($\sigma$) controls a frequency expansion from a band of the audio signal into a target frequency band. In this way, the signal in the target frequency range depending on the bandwidth extension factor ($\sigma$) can be obtained at the output 125 of the overlap adder 124.

In the context of a BWE algorithm, an overlap adder 124 is implemented to induce a temporal spreading of the audio signal by spacing the consecutive blocks of an input time domain signal further apart from each other than the original overlapping consecutive blocks of the audio signal to obtain a spread signal.

In case the decimation is performed after the overlap-add, a temporal spreading by a factor of 2.0, for example, will lead to a spread signal with twice the duration of the original audio signal 100. Subsequent decimation with a corresponding decimation factor of 2.0, for example, will lead to a decimated and bandwidth extended signal having again the original duration of the audio signal 100. However, in case the decimator 120 is placed before the overlap adder 124 as shown in FIG. 2, the decimator 120 may be configured to operate on a bandwidth extension factor ($\sigma$) of 2.0, so that, for example, every second sample is removed from its input time domain signal, which results in a decimated time domain signal with half the duration of the original audio signal 100. Simultaneously, a bandpass-filtered signal in the frequency range of e.g. 2 to 4 kHz will be extended in its bandwidth by a factor 2.0, leading to a signal 121 in the corresponding target frequency range of e.g. 4 to 8 kHz after the decimation. Subsequently, the decimated and bandwidth extended signal may be temporally spread to the original duration of the audio signal 100 by the downstream overlap adder 124. The above processing, essentially, is related to the principle of a phase vocoder.

The signal in the target frequency range obtained from the output 125 of the overlap adder 124 is subsequently supplied to an envelope adjuster 130. On the basis of transmitted parameters received at the input 101 of the envelope adjuster 130 derived from the audio signal 100, the envelope adjuster 130 is implemented to adjust the envelope of the signal at the output 125 of the overlap adder 124 in a determined way, so that a corrected signal at the output 129 of the envelope adjuster 130 is obtained, which comprises an adjusted envelope and/or a corrected tonality.

Figure 3:
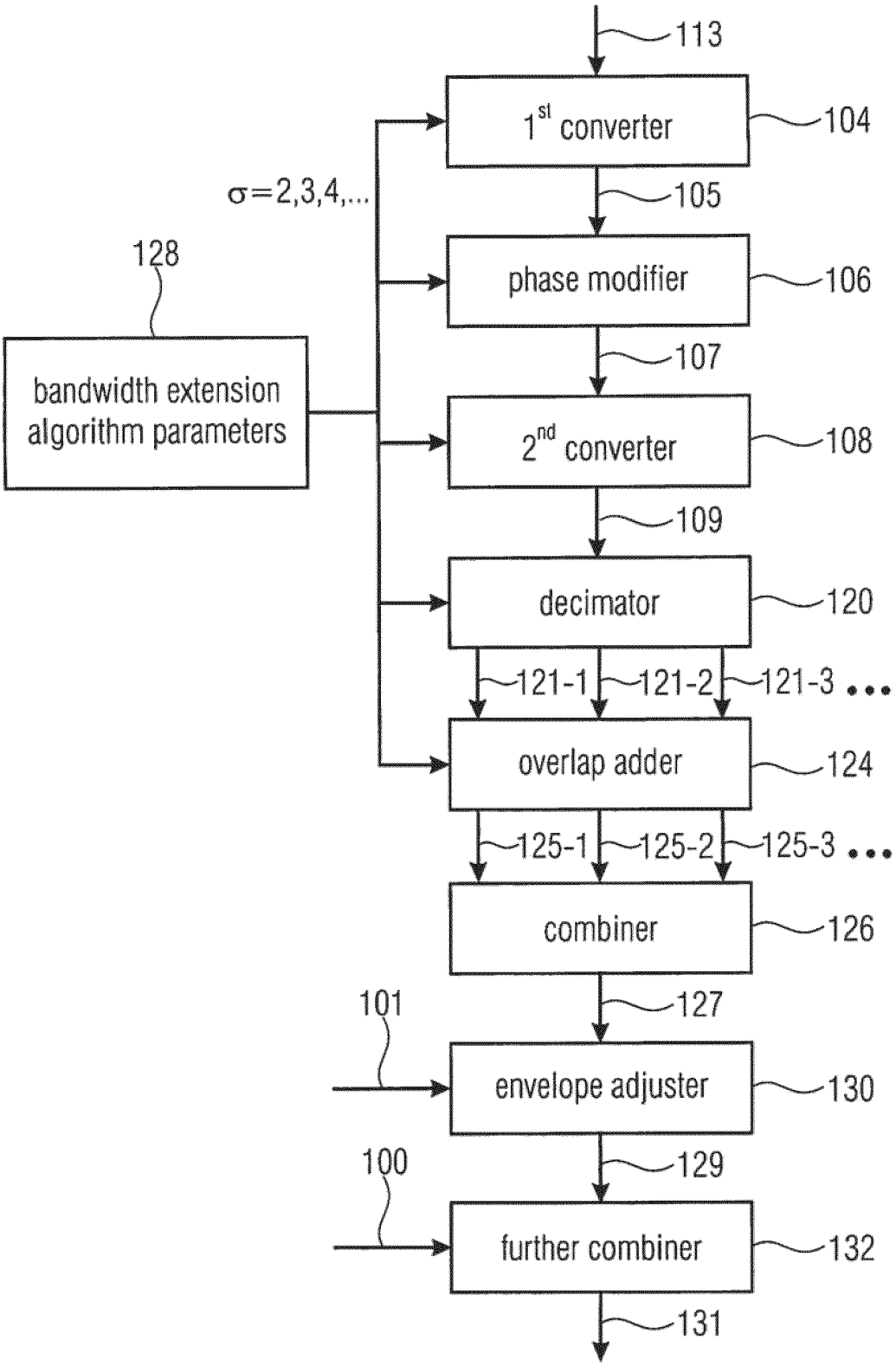
FIG. 3 shows a block diagram of an embodiment for performing a bandwidth extension algorithm using different BWE factors.

FIG. 3 shows a block diagram of an embodiment of the present invention, in which the apparatus is configured for performing a bandwidth extension algorithm using different BWE factors (σ) as, for example, σ=2, 3, 4, . . . . Initially, the bandwidth extension algorithm parameters are forwarded via input 128 to all the devices operating together on the BWE factors (σ). These are, in particular, the first converter 104, the phase modifier 106, the second converter 108, the decimator 120 and the overlap adder 124, as shown in FIG. 3. As described above, the consecutive processing devices for performing the bandwidth extension algorithm are implemented to operate in such a way, that for different BWE factors (σ) at the input 128 corresponding modified time domain audio signals at the outputs 121-1, 121-2, 121-3, . . . , of the decimator 120 are obtained, which are characterized by different target frequency ranges or bands, respectively. Then, the different modified time domain audio signals are processed by the overlap adder 124 based on the different BWE factors (σ), leading to different overlap add results at the outputs 125-1, 125-2, 125-3, . . . , of the overlap adder 124. These overlap add results are finally combined by a combiner 126 at its output 127 to obtain a combined signal comprising the different target frequency bands.

Figure 10:
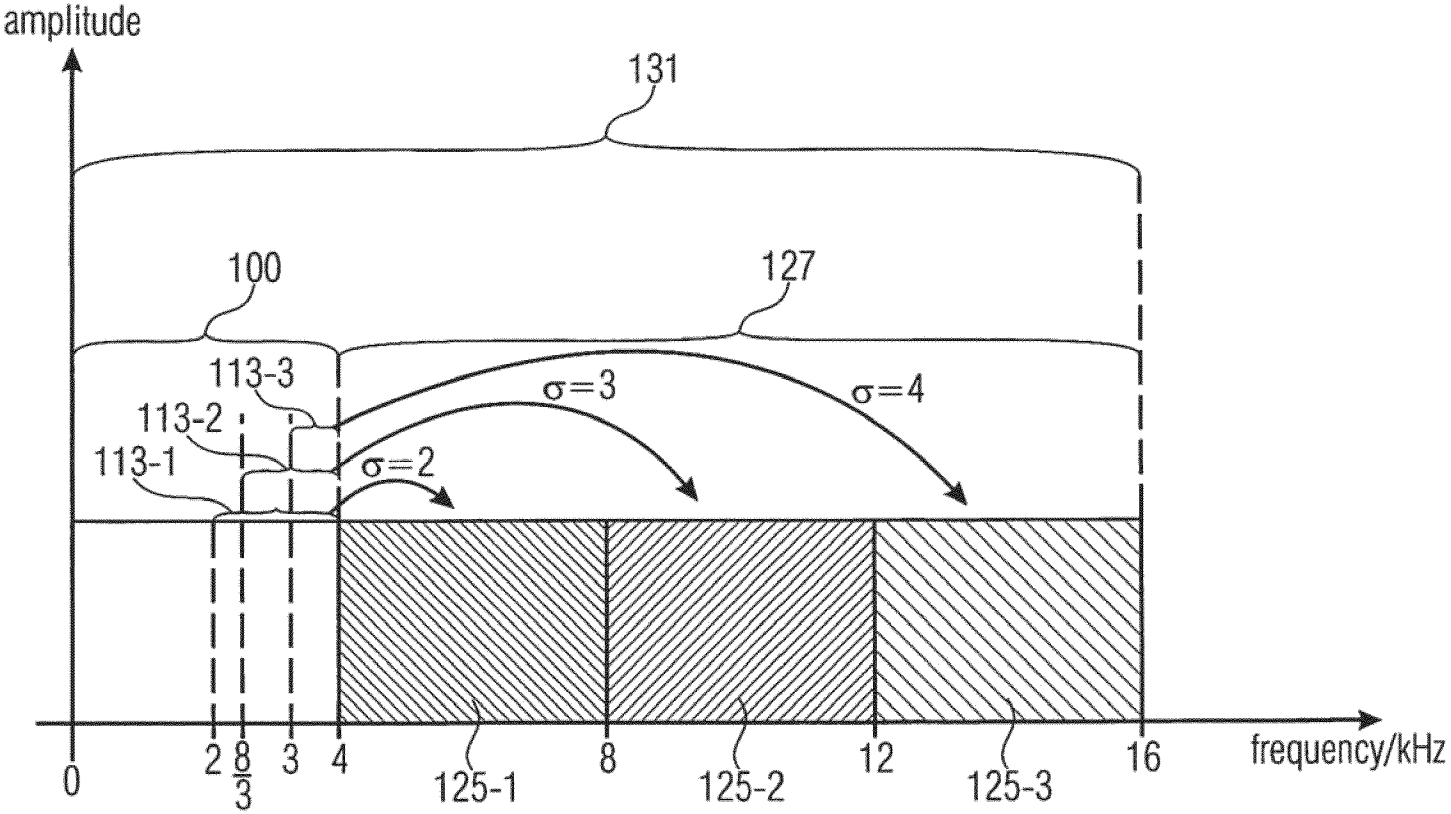
FIG. 10 shows a schematic illustration for a manipulation of a spectral band of an audio signal in a bandwidth extension scheme.

For an illustrative view, the basic principle of the bandwidth extension algorithm is depicted in FIG. 10. In particular, FIG. 10 shows schematically how the BWE factor (σ) controls, for example, the frequency shift between a portion 113-1, 113-2, 113-3 of the band of the audio signal 100 and a target frequency band 125-1, 125-2, or 125-3, respectively.

First, in case of σ=2, a bandpass-filtered signal 113-1 with a frequency range of, for example, 2 to 4 kHz is extracted from the initial band of the audio signal 100. The band of the bandpass-filtered signal 113-1 is then transformed to the first output 125-1 of the overlap adder 124. The first output 125-1 has a frequency range of 4 to 8 kHz corresponding to a bandwidth extension of the initial band of the audio signal 100 by a factor 2.0 (σ=2). This upper band for σ=2 can also be referred as the "first patched band". Next, in case of σ=3, a bandpass-filtered signal 113-2 with the frequency range of 8/3 to 4 kHz is extracted, which is then transformed to the second output 125-2 after the overlap adder 124 characterized by a frequency range of 8 to 12 kHz. The upper band of the output 125-2 corresponding to a bandwidth extension by a factor 3.0 (σ=3) can also be referred as the "second patched band". Next, in case of σ=4, the bandpass-filtered signal 113-3 with a frequency range of 3 to 4 kHz is extracted, which is then transformed to the third output 125-3 with a frequency range of 12 to 16 kHz after the overlap adder 124. The upper band of the output 125-3 corresponding to a bandwidth extension by a factor 4.0 (σ=4) can also be referred as the "third patched band". By this, the first, second and third patched bands are obtained covering consecutive frequency bands up to a maximum frequency of 16 kHz, which may advantageously be used for manipulating the audio signal 100 in the context of a high quality bandwidth extension algorithm. In principle, the bandwidth extension algorithm can also be performed for higher values of the BWE factor σ>4, producing even more high-frequency bands. However, taking into account such high-frequency bands will generally not result in a further improvement of the perceptual quality of the manipulated audio signal.

As shown in FIG. 3, the overlap-add results 125-1, 125-2, 125-3, . . . , based on the different BWE factors (σ), are further combined by a combiner 126, so that a combined signal at the output 127 is obtained comprising the different frequency bands (see FIG. 10). Here, the combined signal at the output 127 consists of the transformed high-frequency patched band, ranging from the maximum frequency ($f_{max}$) of the audio signal 100 to a times the maximum frequency ($\sigma x f_{max}$), as, for example, from 4 to 16 kHz (FIG. 10).

The downstream envelope adjuster 130 is configured as above to modify the envelope of the combined signal based on transmitted parameters from the audio signal present at the input 101, leading to a corrected signal at the output 129 of the envelope adjuster 130. The corrected signal supplied by the envelope adjuster 130 at the output 129 is further combined with the original audio signal 100 by a further combiner 132 in order to finally obtain a manipulated signal extended in its bandwidth at the output 131 of the further combiner 132. As shown in FIG. 10, the frequency range of the bandwidth extended signal at the output 131 comprises the band of the audio signal 100 and the different frequency bands obtained from the transformation according to the bandwidth extension algorithm, in total, for example, ranging from 0 to 16 kHz (FIG. 10).

In an embodiment of the present invention according to FIG. 2, the windower 102 is configured for inserting padded values at specified time positions before a first sample of a consecutive block of audio samples or after a last sample of the consecutive block of audio samples, wherein a sum of a number of padded values and a number of values in the consecutive block is at least 1.4 times the number of values in the consecutive block of audio samples.

In particular, with regard to FIG. 7, a first portion of the padded block having the sample length 712 is inserted before the first sample 708 of the centered consecutive block 704 having the sample length 706, while a second portion of the padded block having the sample length 714 is inserted after the centered consecutive block 704. Note that in FIG. 7 the consecutive block 704 or the analysis window, respectively, is denoted by "region-of-interest" (ROI), wherein the vertical, solid lines crossing the samples 0 and 1000 indicate the borders of the analysis window 704, in which the condition of circular periodicity holds.

Advantageously, the first portion of the padded block left to the consecutive block 704 has the same size as the second portion of the padded block right to the consecutive block 704, wherein the total size of the padded block has a sample length 716 (for example, from sample −500 to sample 1500), which is twice as large as the sample length 706 of the centered consecutive block 704. It is shown in FIG. 7b, for example, that a transient 702 originally located close to the left border of the analysis window 704 will be time-shifted due to a phase modification applied by the phase modifier 106, so that a shifted transient 707 centered around the first sample 708 of the centered consecutive block 704 will be obtained. In this case, the shifted transient 707 will be entirely located inside the padded block having the sample length 716, thus preventing circular convolution or circular wrapping caused by the applied phase modification.

If, for example, the first portion of the padded block left to the first sample 708 of the centered consecutive block 704 is not large enough to fully accommodate a possible time-shift of the transient, the latter will be cyclically convolved, meaning that at least part of the transient will re-appear in the second portion of the padded block right to the last sample 710 of the consecutive block 704. This part of the transient, however, can advantageously be removed by the padding remover 118 after applying the phase modifier 106 in the later stages of the processing. However, the sample length 716 of the padded block should be at least 1.4 times as large as the sample length 706 of the consecutive block 704. It is considered that the phase modification applied by the phase modifier 106 as, for example, realized by a phase vocoder, invariably leads to a time-shift towards negative times, that is to a shift towards the left on the time/sample axis.

In embodiments of the present invention, the first and second converters 104, 108 are implemented to operate on a conversion length, which corresponds to the sample length of the padded block. For example, if the consecutive block has a sample length N, while the padded block has a sample length of at least 1.4×N, such as, for example, 2N, the conversion length applied by the first and the second converter 104, 108 will also be 1.4×N, for example, 2N.

In principle, however, the conversion length of the first converter and the second converter 104, 108 should be chosen depending on the BWE factor (σ) in that the larger the BWE factor (σ) is, the larger the conversion length should be. However, it is advantageously sufficient to use a conversion length as large as the sample length of the padded block, even if the conversion length is not large enough to prevent any kind of cyclic convolution effects for larger values of the BWE factor such as, for example, for σ>4. This is because in such a case (σ>4), temporal aliasing of transient events due to cyclic convolution, for example, is negligible in the transformed high-frequency patched bands and will not significantly influence the perceptual quality.

Figure 4:
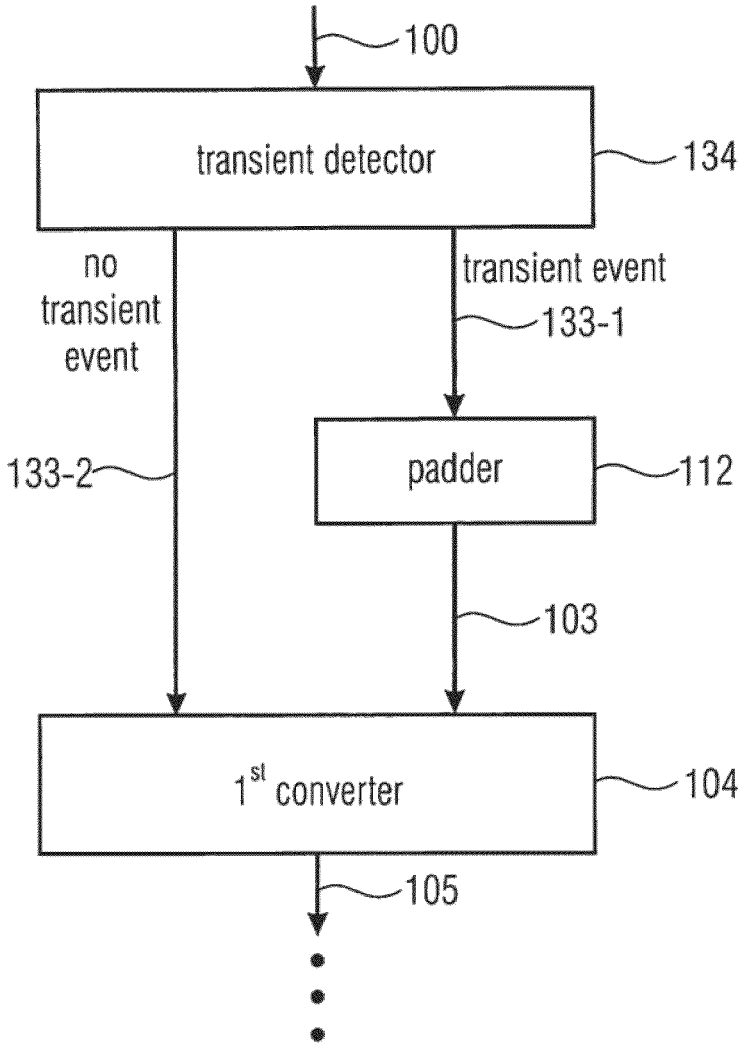
FIG. 4 shows a block diagram of a further embodiment for converting a padded block or a non-padded block using a transient detector.

In FIG. 4, an embodiment is shown comprising a transient detector 134, which is implemented to detect a transient event in a block of the audio signal 100, such as, for example, in the consecutive block 704 of audio samples having the sample length 706, as shown in FIG. 7.

Specifically, the transient detector 134 is configured to determine whether a consecutive block of audio block contains a transient event, which is characterized by a sudden change of the energy of the audio signal 100 in time, such as, for example, an increase or a decrease of energy by more than e.g. 50% from one temporal portion to the next temporal portion.

The transient detection can, for example, be based on a frequency-selective processing such as a square operation of high-frequency parts of a spectral representation representing a measure of the power contained in the high-frequency band of the audio signal 100 and a subsequent comparison of the temporal change in power to a pre-determined threshold.

Furthermore, on the one hand, the first converter 104 is configured to convert the padded block at the output 103 of the padder 112, when the transient event, such as, for example, the transient event 702 of FIG. 7b is detected by the transient detector 134 in a certain block 133-1 of the audio signal 100, which corresponds to the padded block. On the other hand, the first converter 104 is configured to convert a non-padded block having audio signal values only at the output 133-2 of the transient detector 134, wherein the non-padded block corresponds to the block of the audio signal 100, when the transient event is not detected in the block.

Here, the padded block comprises padded values, such as, for example, zero values inserted left and right to the centered consecutive block 704 of FIG. 7b, and audio signal values residing inside the centered consecutive block 704 of FIG. 7b. The non-padded block, however, comprises audio signal values only, such as, for example, those values of audio samples that reside inside the consecutive block 704 of FIG. 7b.

In the above embodiment, in which the conversion by the first converter 104 and therefore, also subsequent processing stages on the basis of the output 105 of the first converter 104 are dependent on the detection of the transient event, the padded block at the output 103 of the padder 112 is generated only for certain selected time blocks of the audio signal 100 (i.e. time blocks containing a transient event), for which padding prior to further manipulation of the audio signal 100 is anticipated to be advantageous in terms of the perceptional quality.

Figure 5:
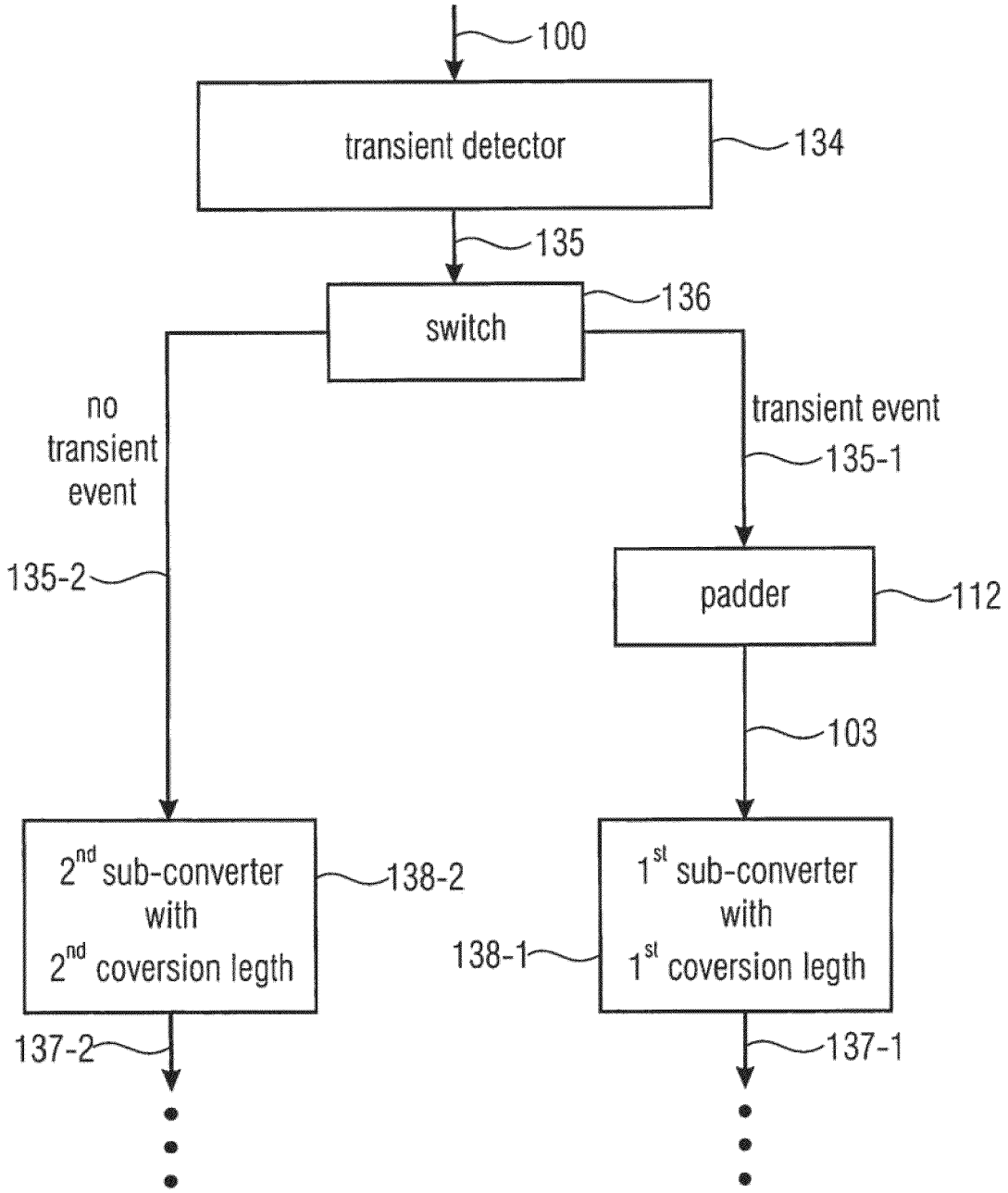
FIG. 5 shows a block diagram of an implementation of an embodiment of FIG. 4.

In further embodiments of the present invention, the choice of the appropriate signal path for the subsequent processing as indicated by "no transient event" or "transient event," respectively, in FIG. 4 is made with the use of the switch 136 as shown in FIG. 5, which is controlled by the output 135 of the transient detector 134 containing information on the detection of the transient event, including the information whether the transient event is detected in the block of the audio signal 100 or not. This information from the transient detector 134 is forwarded by the switch 136 either to the output 135-1 of the switch 136 denoted by "transient event" or the output 135-2 of the switch 136 denoted by "no transient event." Here, the outputs 135-1, 135-2 of the switch 136 in FIG. 5 correspond identically to the outputs 133-1, 133-2 of the transient detector 134 in FIG. 4. As above, the padded block at the output 103 of the padder 112 is generated from the block 135-1 of the audio signal 100 in which the transient event is detected by the transient detector 134. Furthermore, the switch 136 is configured to feed the padded block generated by the padder 112 at the output 103 to first sub-converter 138-1 when the transient event is detected by the transient detector 134 and to feed the non-padded block at the output 135-2 to a second sub-converter 138-2 when the transient event is not detected by the transient detector 134. Here, the first sub-converter 138-1 is adapted to perform a conversion of the padded block using a first conversion length, such as, for example, 2N, while the second sub-converter 138-2 is adapted to perform a conversion of the non-padded block using a second conversion length, such as, for example, N. Because the padded block has a larger sample length than the non-padded block, the second conversion length is shorter than the first conversion length. Finally, a first spectral representation at the output 137-1 of the first sub-converter 138-1 or a second spectral representation at the output 137-2 of the second sub-converter 138-2, respectively, is obtained, which may be further processed in the context of the bandwidth extension algorithm, as illustrated before.

In an alternative embodiment of the present invention, the windower 102 comprises an analysis window processor 140, which is configured to apply an analysis window function to a consecutive block of audio samples, such as, for example, the consecutive block 704 of FIG. 7. The analysis window function applied by the analysis window processor 140, in particular, comprises at least one guard zone at a start position of the window function, such as, for example, the time portion starting at the first sample 718 (i.e., sample −500) of the window function 709 on the left of the consecutive block 704 of FIG. 7b, or at an end position of the window function, such as, for example, the time portion ending at the last sample 720 (i.e., sample 1500) of the window function 709 on the right side of the consecutive block 704 of FIG. 7b.

Figure 6:
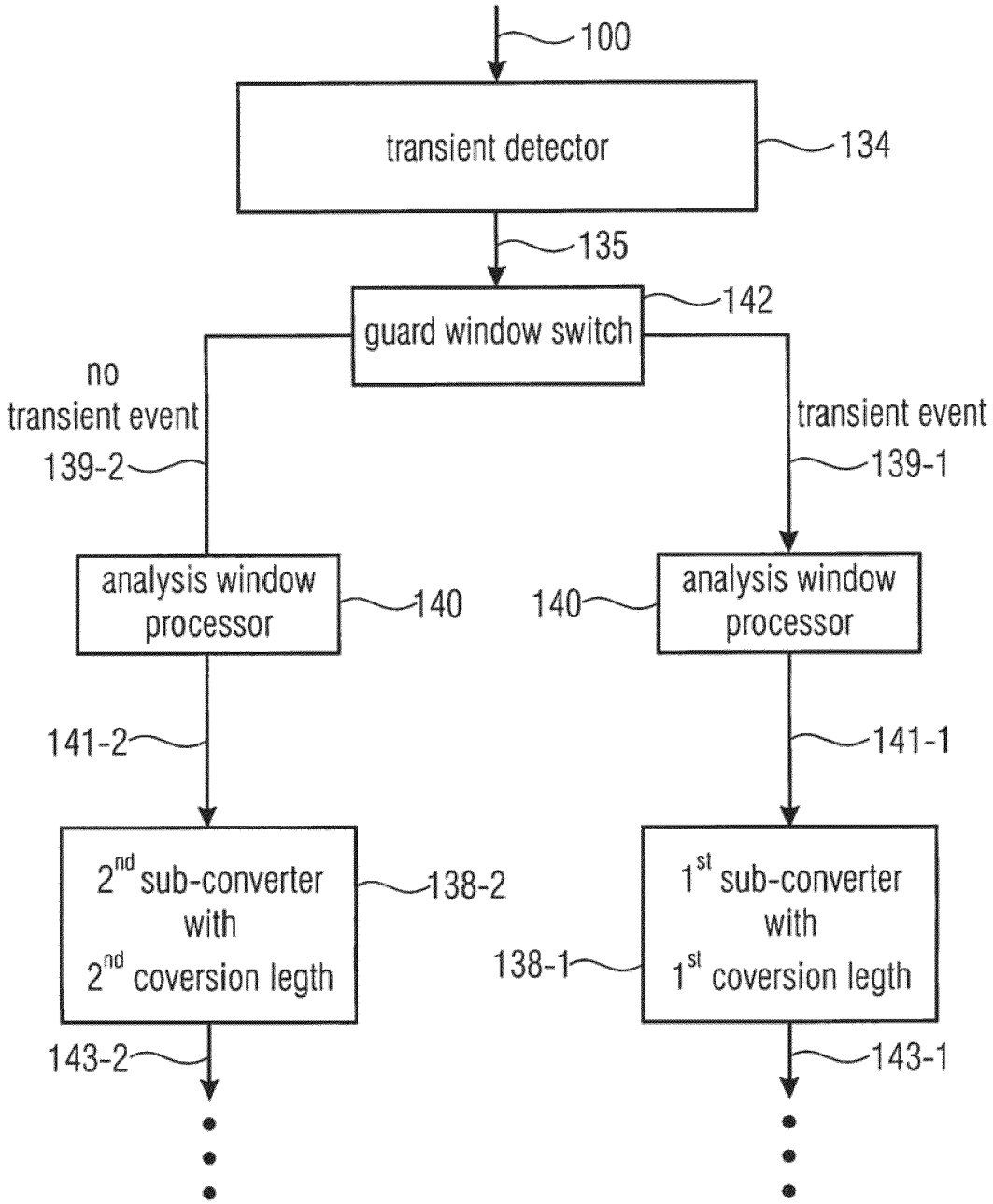
FIG. 6 shows a block diagram of a further implementation of an embodiment of FIG. 4.

FIG. 6 shows an alternative embodiment of the present invention further comprising a guard window switch 142, which is configured to control the analysis window processor 140 depending on the information about the transient detection as provided by the output 135 of the transient detector 134. The analysis window processor 140 is controlled in that a first consecutive block at the output 139-1 of the guard window switch 142 having a first window size is generated when the transient event is detected by the transient detector 134 and a further consecutive block at the output 139-2 of the guard window switch 142 having a second window size is generated when the transient event is not detected by the transient detector 134. Here, the analysis window processor 140 is configured to apply the analysis window function, such as, for example, a Hann window with a guard zone as depicted by FIG. 9a, to the consecutive block at the output 139-1 or the further consecutive block at the output 139-2, so that a padded block at the output 141-1 or a non-padded block at the output 141-2 is obtained, respectively.

Figure 9A:
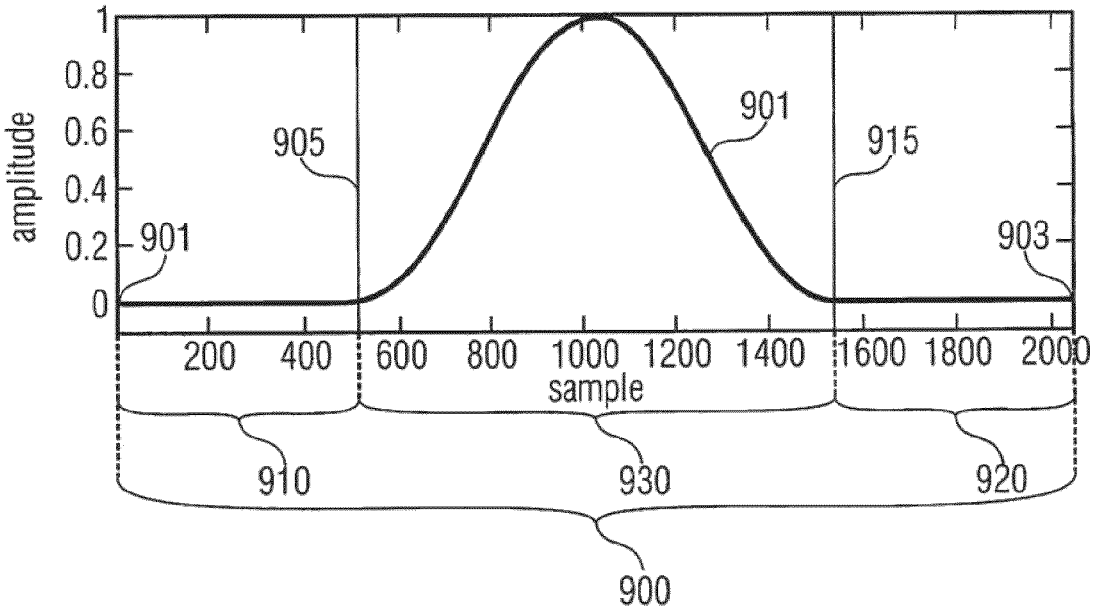
FIG. 9a shows a graph of an exemplary analysis window function in form of a Hann window with guard zones in which the guard zones are characterized by constant zeros, the window to be used in an alternative embodiment of the present invention.

In FIG. 9a, the padded block at the output 141-1, for example, comprises a first guard zone 910 and a second guard zone 920, wherein the values of the audio samples of the guard zones 910, 920 are set to zero. Here, the guard zones 910, 920 surround a zone 930 corresponding to the characteristics of the window function, in this case, for example, given by the characteristic shape of the Hann window. Alternatively, with respect to FIG. 9b, the values of the audio samples of the guard zones 940, 950 can also dither around zero. The vertical lines in FIG. 9 indicate a first sample 905 and a last sample 915 of the zone 930. In addition, the guard zones 910, 940 start with the first sample 901 of the window function, while the guard zone 920, 950 end with the last sample 903 of the window function. The sample length 900 of the complete window having a centered Hann window portion, including the guard zones 910, 920, of FIG. 9a, for example, is twice as large as the sample length of the zone 930.

In the case that the transient event is detected by the transient detector 134, the consecutive block at the output 139-1 is processed in that it is weighted by the characteristic shape of the analysis window function such as, for example, the normalized Hann window 901 with the guard zones 910, 920 as shown in FIG. 9a, while in the case that the transient event is not detected by the transient detector 134, the consecutive block at the output 139-2 is processed in that it is weighted by the characteristic shape of the zone 930 of the analysis window function only such as, for example, the zone 930 of the normalized Hann window 901 of FIG. 9a.

In case that the padded block or non-padded block at the outputs 141-1, 141-2 are generated by use of the analysis window function comprising the guard zone as just mentioned, the padded values or audio signal values originate from the weighting of the audio samples by the guard zone or the non-guarded (characteristic) zone of the window function, respectively. Here, both the padded values and audio signal values represent weighted values, wherein specifically the padded values are approximately zero. Specifically, the padded block or non-padded block at the outputs 141-1, 141-2 may correspond to those at the outputs 103, 135-2 in the embodiment shown in FIG. 5.

Because of the weighting due to the application of the analysis window function, the transient detector 134 and the analysis window processor 140 should advantageously be arranged in such a way that the detection of the transient event by the transient detector 134 takes place before the analysis window function is applied by the analysis window processor 140. Otherwise, the detection of the transient event will be significantly influenced due the weighting process, which is especially the case for a transient event located inside the guard zones or close to the borders of the non-guarded (characteristic) zone, because in this region, the weighting factors corresponding to the values of the analysis window function are close to zero.

The padded block at the output 141-1 and the non-padded block at the output 141-2 are subsequently converted into their spectral representations at the outputs 143-1, 143-2, using the first sub-converter 138-1 with the first conversion length and the second sub-converter 138-2 with the second conversion length, wherein the first and the second conversion length correspond to the sample lengths of the converted blocks, respectively. The spectral representations at the outputs 143-1, 143-2 can be further processed as in the embodiments discussed before.

Figure 8:
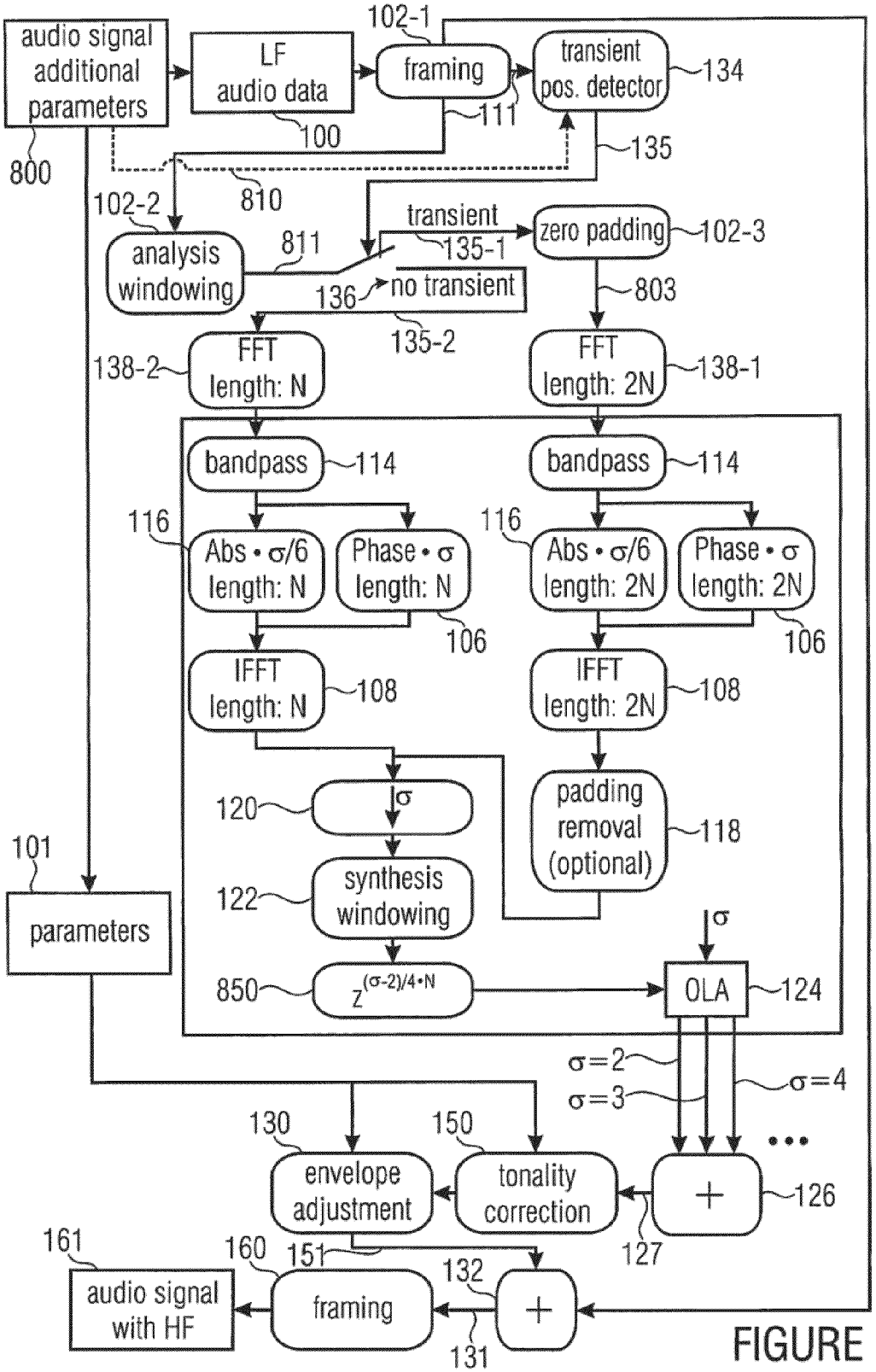
FIG. 8 shows a block diagram of an overview of a further embodiment of the present invention.

FIG. 8 shows an overview of an embodiment of the bandwidth extension implementation. In particular, FIG. 8 includes the block 800 denoted by "audio signal/additional parameters" providing the audio signal 100 denoted by the output block "low frequency (LF) audio data." In addition, the block 800 provides decoded parameters which may correspond to the input 101 of the envelope adjuster 130 in FIGS. 2 and 3. The parameters at the output 101 of the block 800 can subsequently be used for the envelope adjuster 130 and/or a tonality corrector 150. The envelope adjustor 130 and the tonality corrector 150 are configured to apply, for example, a predetermined distortion to the combined signal 127 to obtain the distorted signal 151, which may correspond to the corrected signal 129 of FIGS. 2 and 3.

The block 800 may comprise side information on the transient detection provided on the encoder side of the bandwidth extension implementation. In this case, this side information is further transmitted by a bitstream 810 as indicated by the dashed line to the transient detector 134 on the decoder side.

Advantageously, however, the transient detection is performed on the plurality of consecutive blocks of audio samples at the output 111 of the analysis window processor 110 here referred as a "framing" device 102-1. In other words, the transient side information is either detected in the transient detector 134 representing the decoder or it is transferred in the bitstream 810 from the encoder (dashed line). The first solution does not increase the bitrate to be transmitted, while the latter facilitates the detection, as the original signal is still available.

Figure 13:
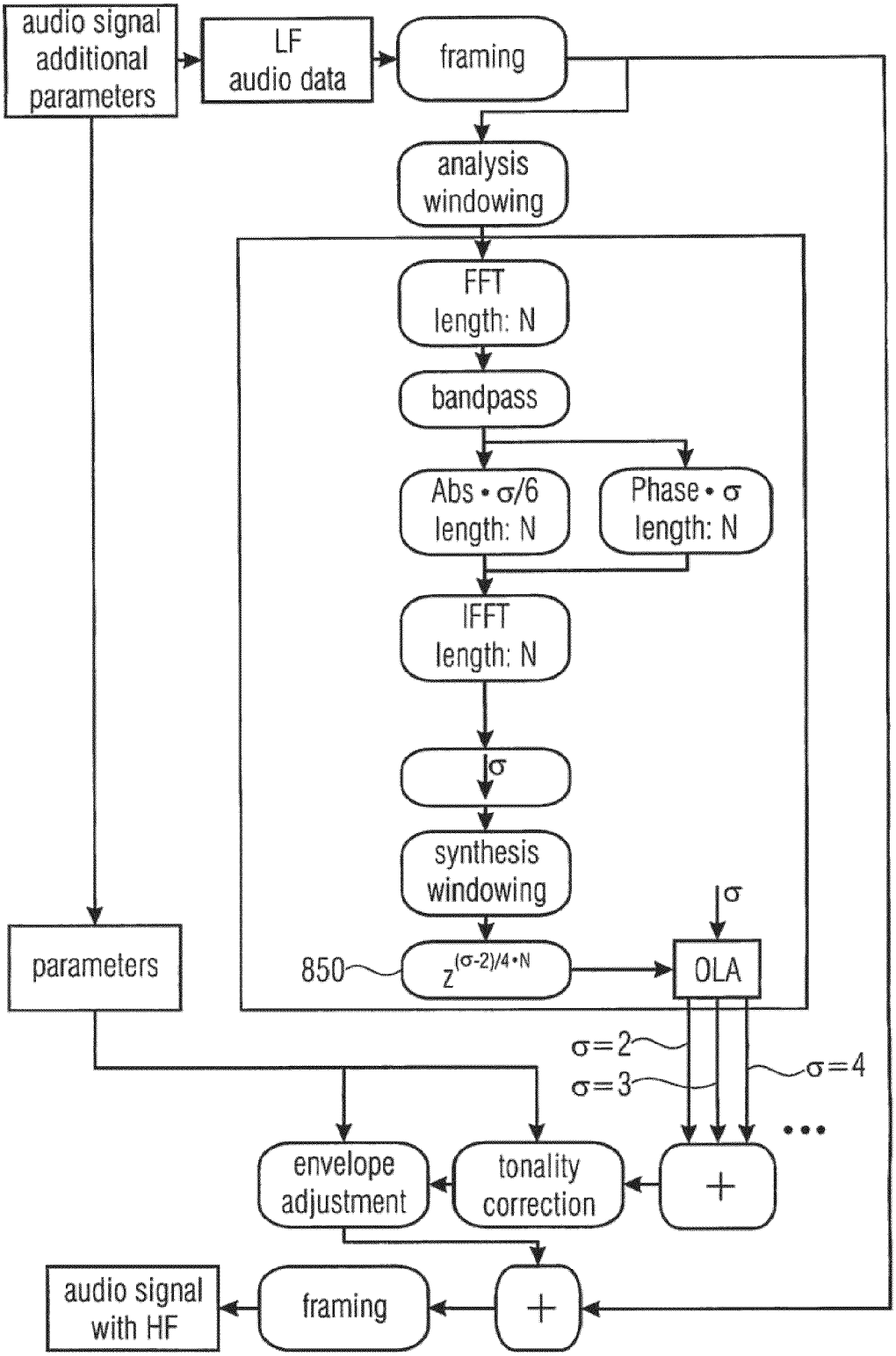
FIG. 13 shows a block diagram of a typical harmonic bandwidth extension (HBE) implementation.

Specifically, FIG. 8 shows a block diagram of an apparatus being configured to perform a harmonic bandwidth extension (HBE) implementation, as shown in FIG. 13, which is combined with the switch 136, controlled by the transient detector 134, to execute a signal adaptive processing, depending on the information on the occurrence of a transient event at the output 135.

In FIG. 8, the plurality of consecutive blocks at the output 111 of the framing device 102-1 is supplied to an analysis windowing device 102-2, which is configured to apply an analysis window function having a pre-determined window shape, such as, for example, a raised-cosine window, which is characterized by less deep flanks as compared to a rectangular window shape typically applied in a framing operation. Depending on the switching decision denoted by "transient" or "no transient" obtained with the switch 136, the block 135-1 including the transient event or the block 135-2 not including the transient event, respectively, of the plurality of consecutive windowed (i.e. framed and weighted) blocks at the output 811 of the analysis windowing device 102-2, as detected by the transient detector 134, are further processed as discussed in detail before. Especially, a zero padding device 102-3, which may correspond to the padder 112 of the window 102 in FIGS. 2, 4 and 5 is advantageously used to insert zero values outside of the time block 135-1, so that a zero-padded block 803, which may correspond to the padded block 103, with the sample length 2N twice as large as the sample length N of the time block 135-2 is obtained. Here, the transient detector 134 is denoted by "transient position detector," because it can be used to determine the "position" (i.e. time location) of the consecutive block 135-1 with respect to the plurality of consecutive blocks at the output 811, i.e. the respective time block that contains the transient event can be identified from the sequence of consecutive blocks at the output 811.

In one embodiment, the padded block is generated from a specific consecutive block for which the transient event is detected, independent of its location within the block. In this case, the transient detector 134 is simply configured to determine (identify) the block containing the transient event. In an alternative embodiment, the transient detector 134 can furthermore be configured to determine the particular location of the transient event with respect to the block. In the former embodiment, a simpler implementation of the transient detector 134 can be used, while in the latter embodiment, the computational complexity of the processing may be reduced, because the padded block will be generated and further processed only if a transient event is located at a particular location, advantageously close to a block border. In other words, in the latter embodiment, zero padding or guard zones will only be needed if a transient event is located near the block borders (i.e., if off-center transients occur).

The apparatus of FIG. 8, essentially, provides a method to counteract the cyclic convolution effect by introducing so-called "guard intervals" by zero-padding both ends of each time block before entering the phase vocoder processing. Here, the phase vocoder processing starts with the operation of the first or the second sub-converter 138-1, 138-2, comprising, for example, an FFT processor having a conversion length of 2N or N, respectively.

Specifically, the first converter 104 can be implemented to perform a short-time Fourier transformation (SIFT) of the padded block 103, while the second converter 108 can be implemented to perform an inverse SIFT based on the magnitude and phase of the modified spectral representation at the output 105.

With regard to FIG. 8, after the new phases have been calculated and, for example, the inverse STFT or inverse Discrete Fourier Transform (IDFT) synthesis is performed, the guard intervals are simply stripped off from the central part of the time block, which is further processed in the overlap-add (OLA) stage of the vocoder. Alternatively, the guard intervals are not to be removed, but are further processed in the OLA stage. This operation can effectively also be seen as an oversampling of the signal.

As a result from the implementation according to FIG. 8, a manipulated signal extended in bandwidth is obtained at the output 131 of the further combiner 132. Subsequently, a further framing device 160 may be used to modify the framing (i.e. the window size of the plurality of consecutive time blocks) of the manipulated audio at the output 131 signal denoted by "audio signal with high frequency (HF)" in a pre-determined way, for example, such that the consecutive block of audio samples at the output 161 of the further framing device 160 will have the same window size as the initial audio signal 800.

The possible advantage of using guard intervals in this context while processing transients by a phase vocoder, as, for example, outlined in the embodiment of FIG. 8, is exemplarily visualized in FIG. 7. Panel a) shows the transient centered in the analysis window ("thin dashed" indicates original signal). In this case, the guard interval has no significant effect on the processing since the window can also accommodate the modified transient ('thin solid' using guard intervals, 'thick solid' without guard intervals). However, as shown in Panel b), if the transient is off-center ("thin dashed" indicates original signal), it will be time shifted by the phase manipulation during the vocoder processing. If this shift cannot be accommodated directly by the time span covered by the window, circular wrapping occurs ('thick solid' without guard intervals) that eventually leads to a misplacement of (parts of) the transient, thereby degrading the perceptual audio quality. However, the use of guard intervals prevents circular convolution effects by accommodating the shifted parts in the guard zone ('thin solid' using guard intervals).

Figure 9B:
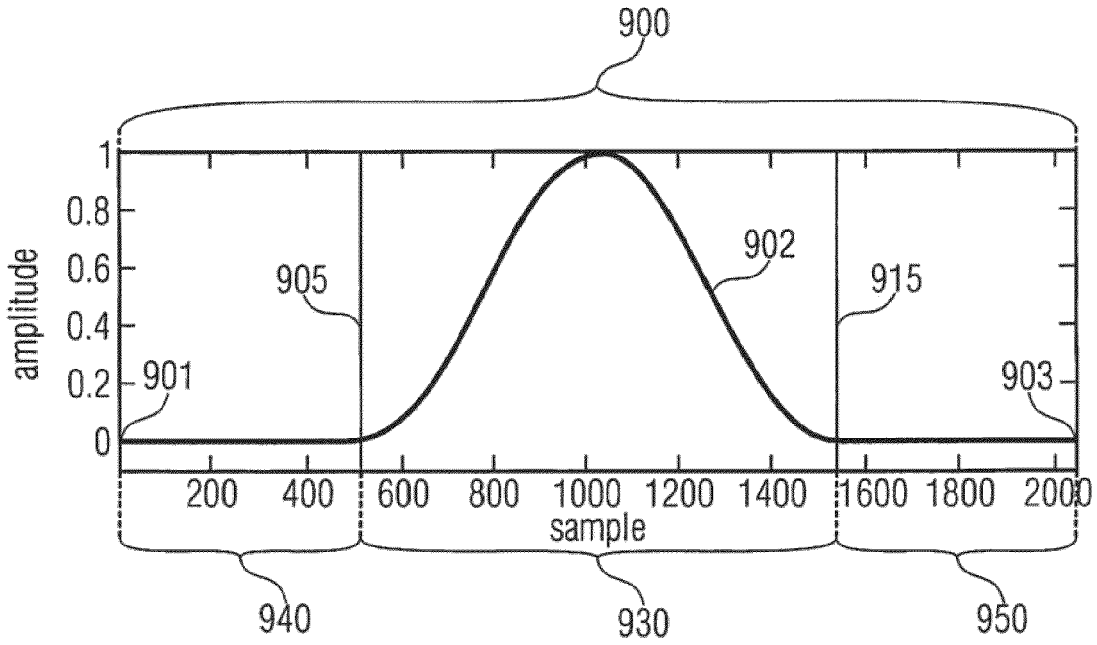
FIG. 9b shows a graph of an exemplary analysis window function in form of a Hann window with guard zones in which the guard zones are characterized by dithers, the window to be used in a further alternative embodiment of the present invention.

As an alternative to the above zero padding implementation, windows with guard zones (see FIG. 9) can be used as mentioned before. In the case of the windows with guard zones, on one or both sides of the windows the values are about zero. They can be exactly zero or dither around zero with the possible advantage of not shifting zeros from the guard zone into the window through the phase adaption but small values. FIG. 9 shows both types of windows. Particularly, in FIG. 9, the difference between the window functions 901, 902 is that in FIG. 9a the window function 901 comprises the guard zones 910, 920 whose sample values are exactly zero, while in FIG. 9b the window function 902 comprises the guard zones 940, 950 whose sample values dither around zero. Therefore, in the latter case, small values instead of zero values will be shifted through the phase adaption from the guard zone 940 or 950 into the zone 930 of the window.

As mentioned before, the application of guard intervals may increase the computational complexity due to its equivalents to oversampling since analysis and synthesis transforms have to be calculated on signal blocks of substantially extended length (usually a factor of 2). On the one hand, this ensures an improved perceptual quality at least for transient signal blocks, but these occur only in selected blocks of an average music audio signal. On the other hand, processing power is steadily increased throughout the processing of the entire signal.

Embodiments of the invention are based on the fact that oversampling is only advantageous for certain selected signal blocks. Specifically, the embodiments provide a novel signal adaptive processing method that comprises a detection mechanism and applies oversampling only to those signal blocks where it indeed improves perceptual quality. Moreover, by the signal processing adaptively switching between standard processing and advanced processing, the efficiency of the signal processing in the context of the present invention can be significantly increased, thus reducing the computational effort.

To illustrate the difference between the standard processing and the advanced processing, the comparison of a typical harmonic bandwidth extension (HBE) implementation (FIG. 13) with the implementation of FIG. 8 will be made in the following.

FIG. 13 depicts an overview of HBE. Here, the multiple phase vocoder stages operate on the same sampling frequency as the entire system. FIG. 8, however, shows the way of processing applying zero padding/oversampling only to those parts of the signal, where it is truly beneficial and results in an improved perceptual quality. This is achieved by a switching decision, which is advantageously dependent on a transient location detection that chooses the appropriate signal path for the subsequent processing. Compared to HBE shown in FIG. 13, the transient location detection 134 (from signal or bitstream), the switch 136 and the signal path on the right hand side, starting with the zero padding operation applied by the zero padder 102-3 and ending with the (optional) padding removal performed by the padding remover 118, has been added in the embodiments as illustrated in FIG. 8.

Figure 12:
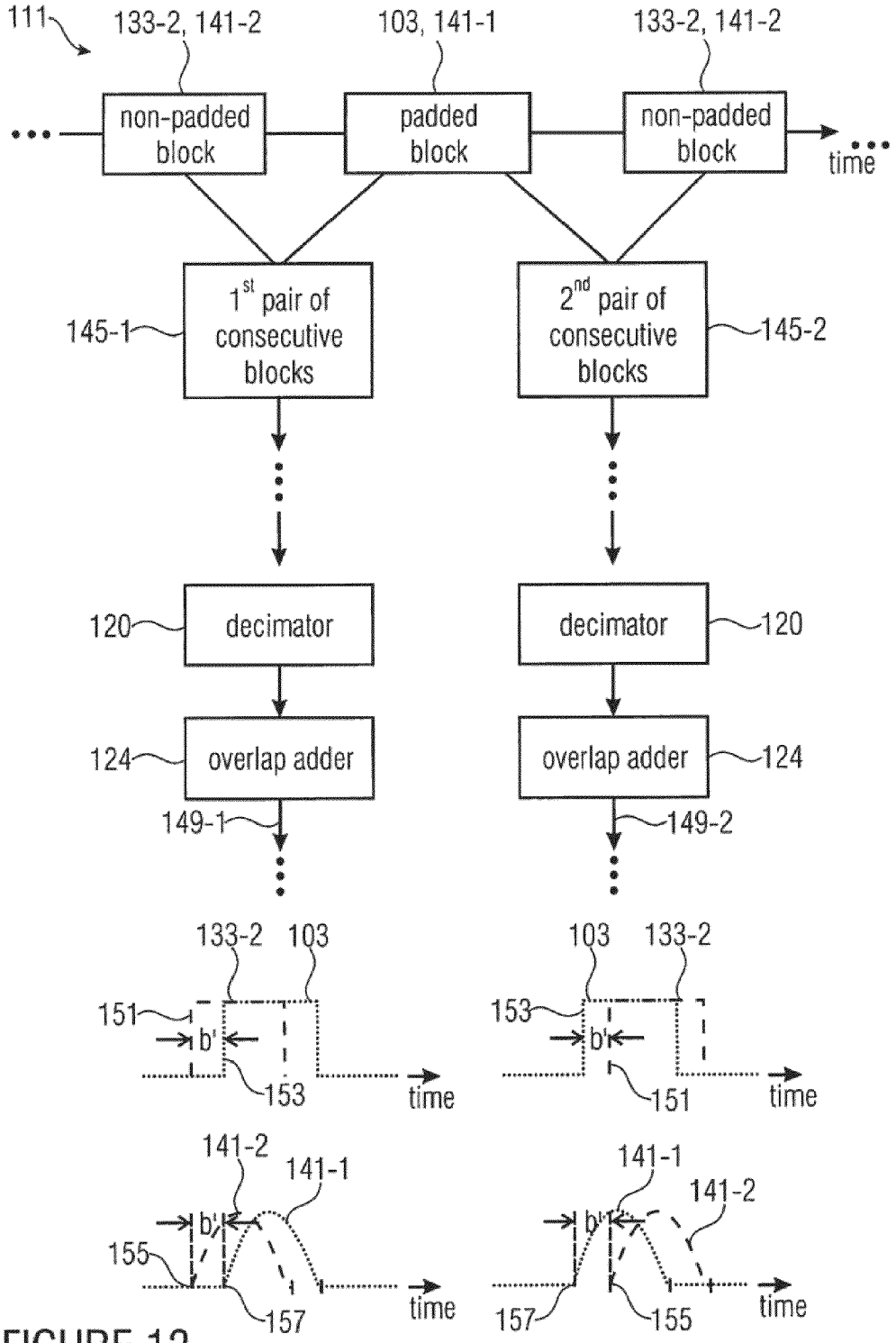
FIG. 12 shows a block diagram and a schematic illustration for an implementation of an alternative embodiment based on FIG. 4.

In one embodiment of the present invention, the windower 102 is configured for generating a plurality 111 of consecutive blocks of audio samples forming a time sequence, which comprises at least a first pair 145-1 of a non-padded block 133-2, 141-2 and a consecutive padded block 103, 141-1 and a second pair 145-2 of a padded block 103, 141-1 and a consecutive non-padded block 133-2, 141-2 (see FIG. 12). The first and the second pair of consecutive blocks 145-1, 145-2 are further processed in the context of the bandwidth extension implementation, until their corresponding decimated audio samples are obtained at the outputs 147-1, 147-2 of the decimator 120, respectively. The decimated audio samples 147-1, 147-2 are subsequently fed into the overlap adder 124, which is configured to add overlapping blocks of the decimated audio samples 147-1, 147-2 of the first pair 145-1 or the second pair 145-2.

Alternatively, the decimator 120 can also be positioned after the overlap adder 124 as described correspondingly before.

Then, for the first pair 145-1, a time distance b', which may correspond to the time distance b of FIG. 2, between a first sample 151, 155 of the non-padded block 133-2, 141-2 and a first sample 153, 157 of the audio signal values of the padded block 103, 141-1, respectively, is supplied by the overlap adder 124, so that a signal in the target frequency range of the bandwidth extension algorithm is obtained at the output 149-1 of the overlap adder 124.

For the second pair 145-2, the time distance b' between a first sample 153, 157 of the audio signal values of the padded block 103, 141-1 and a first sample 151, 155 of the non-padded block 133-2, 141-2, respectively, is supplied by the overlap adder 124, so that a signal in the target frequency range of the bandwidth extension algorithm at the output 149-2 of the overlap adder 124 is obtained.

Again, in case the decimator 120 is placed before the overlap adder 124 in the processing chain as shown in FIG. 2, a possible effect of the decimation on the correspondence to the time distance b' should be taken into account.

It is to be noted that although the present invention has been described in the context of block diagrams where the blocks represent actual or logical hardware components, the present invention can also be implemented by a computer-implemented method. In the latter case, the blocks represent corresponding method steps where these steps stand for the functionalities performed by corresponding logical or physical hardware blocks.

The described embodiments are merely illustrative for the principles of the present invention. It is understood that, modifications and variations of the arrangements and the details described herein will be apparent to others skilled in the art. It is the intent, therefore, to be limited only by the scope of the impending patent claims and not by the specific details presented by way of description and explanation of the embodiments herein.

Depending on certain implementation requirements of the inventive methods, the inventive methods can be implemented in hardware or in software. The implementation can be performed using a digital storage medium, in particular a disc, a DVD or a CD having electronically-readable control signals stored thereon, which co-operate with programmable computer systems, such that the inventive methods are performed. Generally, the present can therefore be implemented as a computer program product with the program code stored on a machine-readable carrier, the program code being operated for performing the inventive methods when the computer program product runs on a computer. In other words, the inventive methods are, therefore, a computer program having a program code for performing at least one of the inventive methods when the computer program runs on a computer. The inventive processed audio signal can be stored on any machine-readable storage medium, such as a digital storage medium.

The advantages of the novel processing are that the above-mentioned embodiments, i.e. apparatus, methods or computer programs, described in this application avoid costly over-complex computational processing where it is not necessary. It utilizes a transient location detection which identifies time blocks containing, for example, off-centered transient events and switches to advanced processing, e.g. oversampled processing using guard intervals, however, only in those cases, where it results in an improvement in terms of perceptual quality.

The presented processing is useful in any block based audio processing application, e.g. phase vocoders, or parametrics surround sound applications (Herre, J.; Faller, C.; Ertel, C.; Hilpert, J.; Hölzer, A.; Spenger, C, "MP3 Surround: Efficient and Compatible Coding of Multi-Channel Audio," $116^{th}$ Cony. Aud. Eng. Soc., May 2004), where temporal circular convolution effects lead to aliasing and, at the same time, processing power is a limited resource.

Most prominent applications are audio decoders, which are often implemented on hand-held devices and thus operate on a battery power supply.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

[1. An apparatus for manipulating an audio signal, comprising:

a windower configured for generating a plurality of consecutive blocks of audio samples, the plurality of the consecutive blocks comprising at least one padded block of audio samples, the padded block comprising padded values and audio signal values;

a first converter configured for converting the padded block into a spectral representation comprising spectral values;

a phase modifier configured for modifying phases of the spectral values to achieve a modified spectral representation;

a second converter configured for converting the modified spectral representation into a modified time domain audio signal; and a transient detector configured for detecting a transient event in the audio signal, wherein the first converter is configured for converting the padded block, when the transient detector detects the transient event in a block of the audio signal corresponding to the padded block, wherein the first converter is configured for converting a non-padded block comprising audio signal values only, the non-padded block corresponding to the non-padded block of the audio signal, when the transient detector does not detect the transient event in the non-padded block of the audio signal, and wherein at least one of the windower, the phase modifier, the second converter, and the transient detector comprises a hardware implementation.]

[2. The apparatus according to claim 1, further comprising:

a decimator configured for decimating the modified time domain audio signal or overlap-added blocks of modified time domain audio samples to acquire a decimated time domain signal, wherein a decimation characteristic depends on a phase modification characteristic applied by the phase modifier.]

[3. The apparatus in accordance with claim 2, which is adapted for performing a bandwidth extension using the audio signal, further comprising:

a band pass filter configured for extracting a bandpass signal from the spectral representation or from the audio signal, wherein a bandpass characteristic of the bandpass filter is selected depending on a phase modification characteristic applied by the phase modifier, so that the bandpass signal is transformed by subsequent processing in a bandwidth extension scheme to a target frequency range, the target frequency range comprising a frequency range not included in a frequency range of the audio signal.]

[4. The apparatus in accordance with claim 2, further comprising:

an overlap adder configured for adding overlapping blocks of decimated audio samples or modified time domain audio samples of the modified time domain audio signal to acquire a signal in a target frequency range of a bandwidth extension algorithm.]

[5. The apparatus according to claim 2, further comprising:

a synthesis windower configured for windowing the decimated time domain signal or the modified time domain audio signal comprising a synthesis window function matched to an analysis function applied by the windower.]

[6. The apparatus according to claim 2, the apparatus being configured for performing a bandwidth extension algorithm, the bandwidth extension algorithm comprising a bandwidth extension factor, the bandwidth extension factor controlling a frequency shift between a band of the audio signal and a target frequency band, wherein the first converter, the phase modifier, the second converter and the decimator are configured to operate using different bandwidth extension factors, so that different modified time audio signals comprising different target frequency bands are achieved, wherein the apparatus comprises an overlap adder configured for performing an overlap add based on the different bandwidth extension factors, and a combiner configured for combining overlap add results to acquire a combined signal comprising the different target frequency bands.]

[7. The apparatus according to claim 4, further comprising:

a scaler configured for scaling the spectral values by a factor, wherein the factor depends on an overlap add characteristic in that a relation of a first time distance for an overlap-add applied by the windower and a different time distance applied by the overlap adder and a window characteristics is accounted for.]

[8. The apparatus according to claim 4, further comprising:

an envelope adjuster configured for adjusting an envelope of the signal in the target frequency range of the bandwidth extension algorithm or a combined signal based on transmitted parameters to acquire a corrected signal; and a further combiner configured for combining the audio signal and the corrected signal to acquire a manipulated signal which is extended in bandwidth.]

[9. The apparatus according to claim 1, wherein the windower comprises:

an analysis window processor configured for generating a plurality of consecutive blocks having identical sizes; and a padder configured for padding a block of the plurality of the consecutive blocks of audio samples to achieve the padded block by inserting the padded values at specified time positions before a first sample of a consecutive block of audio samples or after a last sample of the consecutive block of audio samples.]

[10. The apparatus according to claim 1, in which the windower is configured for inserting the padded values at specified time positions before a first sample of a consecutive block of audio samples or after a last sample of the consecutive block of audio samples, the apparatus further comprising:

a padding remover configured for removing samples at time positions of the modified time domain audio signal, the time positions corresponding to the specified time positions applied by the windower.]

[11. The apparatus according to claim 10, in which the windower is configured for symmetrically inserting the padded values before the first sample of the consecutive block of audio samples and after the last sample of the consecutive block of audio samples, so that the padded block is adapted to a conversion by the first converter and the second converter.]

[12. The apparatus according to claim 1, in which the windower is configured for inserting the padded values at specified time positions before a first sample of a consecutive block of audio samples or after a last sample of the consecutive block of audio samples, wherein a sum of a number of the padded values and a number of values in the consecutive block of audio samples is at least 1.4 times the number of values in the consecutive block of audio samples.]

[13. The apparatus according to claim 1, wherein the windower is configured for applying a window function comprising at least one guard zone at a start position of the window function or at an end position of the window function.]

[14. The apparatus according to claim 1, the apparatus being configured for performing a bandwidth extension algorithm, the bandwidth extension algorithm comprising a bandwidth extension factor, the bandwidth extension factor controlling a frequency shift between a band of the audio signal and a target frequency band, wherein the phase modifier is configured to scale phases of spectral values of the band of the audio signal by the bandwidth extension factor, so that at least one sample of a consecutive block of audio samples is cyclically convolved into a block.]

[15. The apparatus according to claim 1, wherein the windower comprises:

a padder configured for inserting the padded values at specified time positions before a first sample of a consecutive block of audio samples or after a last sample of the consecutive block of audio samples, the apparatus further comprising:

a switch which is controlled by the transient detector, wherein the switch is configured to control the padder so that the padded block is generated when a transient event is detected by the transient detector, the padded block comprising the padded values and the audio signal values, and to control the padder, so that a non-padded block is generated when the transient event is not detected by the transient detector, the non-padded block comprising audio signal values only, wherein the first converter comprises a first sub-converter and a second sub-converter, wherein the switch is furthermore configured to feed the padded block to the first sub-converter to perform a conversion comprising a first conversion length when the transient event is detected by the transient detector and to feed the non-padded block to the second sub-converter to perform a conversion comprising a second length shorter than the first length when the transient event is not detected by the transient detector.]

[16. The apparatus according to claim 1, wherein the windower comprises an analysis window processor configured for applying an analysis window function to a consecutive block of audio samples, the analysis window processor being controllable so that the analysis window function comprises a guard zone at a start position of the analysis window function or an end position of the analysis window function, the apparatus further comprising:

a guard window switch which is controlled by the transient detector, wherein the guard window switch is configured to control the analysis window processor, so that a padded block is generated from a consecutive block of audio samples by use of the analysis window function comprising the guard zone, the padded block comprising the padded values and the audio signal values when a transient event is detected by the transient detector, and to control the analysis window processor, so that a non-padded block is generated, the non-padded block comprising the audio signal values only, when the transient event is not detected by the transient detector, wherein the first converter comprises a first sub-converter and a second sub-converter, wherein the guard window switch is furthermore configured to feed the padded block to the first sub-converter to perform a conversion comprising a first conversion length when a transient event is detected by the transient detector and to feed the non-padded block to the second sub-converter to perform a conversion comprising a second length shorter than the first length when the transient event is not detected by the transient detector.]

[17. The apparatus according to claim 1, wherein the windower is configured for generating the plurality of the consecutive blocks of the audio samples, the plurality of the consecutive blocks comprising at least a first pair of a non-padded block and a consecutive padded block and a second pair of a padded block and a consecutive non-padded block, the apparatus further comprising:

a decimator configured for decimating modified time domain audio samples or overlap-added blocks of the modified time domain audio samples of the first pair to acquire decimated audio samples of the first pair or for decimating the modified time domain audio samples or overlap-added blocks of the modified time domain audio samples of the second pair to acquire decimated audio samples of the second pair, and an overlap adder, wherein the overlap adder is configured for adding overlapping blocks of the decimated audio samples or the modified time domain audio samples of the first pair or the second pair, wherein for the first pair a time distance between a first sample of the non-padded block and a first sample of audio signal values of the padded block is supplied by the overlap adder, or wherein for the second pair a time distance between a first sample of the audio signal values of the padded block and a first sample of the non-padded block is supplied by the overlap adder, to acquire a signal in a target frequency range of a bandwidth extension algorithm.]

[18. A method for manipulating an audio signal, comprising:

generating, by a windower, a plurality of consecutive blocks of audio samples, the plurality of the consecutive blocks of the audio samples comprising at least one padded block of audio samples, the padded block comprising padded values and audio signal values;

converting, by a first converter, the padded block into a spectral representation comprising spectral values;

modifying, by a phase modifier, phases of the spectral values to achieve a modified spectral representation; and converting, by a second converter, the modified spectral representation into a modified time domain audio signal, determining, by a transient detector, a transient event in the audio signal, wherein the padded block is converted into the spectral representation, when the transient event is detected in a block of the audio signal corresponding to the padded block, and wherein a non-padded block comprising audio signal values only is converted into the spectral representation, the non-padded block corresponding to the block of the audio signal, when the transient event is not detected in the block of the audio signal, and wherein at least one of the windower, the phase modifier, the second converter, and the transient detector comprises a hardware implementation.]

[19. A non-transitory storage medium having stored thereon a computer program comprising a program code for performing a method for manipulating an audio signal when the computer program is executed on a computer, said method comprising:

generating a plurality of consecutive blocks of audio samples, the plurality of the consecutive blocks of the audio samples comprising at least one padded block of audio samples, the padded block comprising padded values and audio signal values;

converting the padded block into a spectral representation comprising spectral values;

modifying phases of the spectral values to achieve a modified spectral representation;

converting the modified spectral representation into a modified time domain audio signal; and determining a transient event in the audio signal, wherein the padded block is converted into the spectral representation, when the transient event is detected in a block of the audio signal corresponding to the padded block, and wherein a non-padded block comprising audio signal values only is converted into the spectral representation, the non-padded block corresponding to the block of the audio signal, when the transient event is not detected in the block of the audio signal.]

*20. A method for manipulating an audio signal, comprising:*

*generating, by a windower, a plurality of consecutive blocks of audio samples, the plurality of the consecutive blocks of the audio samples comprising at least one padded block of audio samples, the padded block comprising padded values and audio signal values, wherein the generating comprises inserting the padded values at specified time positions before a first sample of a consecutive block of audio samples or after a last sample of the consecutive block of audio samples, wherein a sum of a number of the padded values and a number of audio signal values in the consecutive block of audio samples is at least 1.4 times the number of the audio signal values in the consecutive block of audio samples;*

*converting, by a first converter, the padded block into a spectral representation comprising spectral values;*

*modifying, by a phase modifier, phases of the spectral values to achieve a modified spectral representation; and*

*converting, by a second converter, the modified spectral representation into a modified time domain audio signal,*

*determining, by a transient detector, a transient event in the audio signal,*

*wherein the padded block is converted into the spectral representation, when the transient event is detected in a block of the audio signal corresponding to the padded block,*

*wherein a non-padded block comprising audio signal values only is converted into the spectral representation, the non-padded block corresponding to the block of the audio signal, when the transient event is not detected in the block of the audio signal, and*

*wherein at least one of the windower, the phase modifier, the second converter, and the transient detector comprises a hardware implementation.*

*21. A non-transitory storage medium having stored thereon a computer program comprising a program code for performing a method for manipulating an audio signal when the computer program is executed on a computer, said method comprising:*

*generating a plurality of consecutive blocks of audio samples, the plurality of the consecutive blocks of the audio samples comprising at least one padded block of audio samples, the padded block comprising padded values and audio signal values, wherein the generating comprises inserting the padded values at specified time positions before a first sample of a consecutive block of audio samples or after a last sample of the consecutive block of audio samples, wherein a sum of a number of the padded values and a number of audio signal values in the consecutive block of audio samples is at least 1.4 times the number of the audio signal values in the consecutive block of audio samples;*

*converting the padded block into a spectral representation comprising spectral values;*

*modifying phases of the spectral values to achieve a modified spectral representation;*

*converting the modified spectral representation into a modified time domain audio signal; and*

*determining a transient event in the audio signal,*

*wherein the padded block is converted into the spectral representation, when the transient event is detected in a block of the audio signal corresponding to the padded block, and*

*wherein a non-padded block comprising audio signal values only is converted into the spectral representation, the non-padded block corresponding to the block of the audio signal, when the transient event is not detected in the block of the audio signal.*

*22. The method in accordance with claim 20, which is adapted for performing a bandwidth extension using the audio signal, further comprising:*

*using a band pass filter configured for extracting a bandpass signal from the spectral representation or from the audio signal, wherein a bandpass characteristic of the bandpass filter is selected depending on a phase modification characteristic applied by the phase modifier, so that the bandpass signal is transformed by a subsequent processing in a bandwidth extension scheme to a target frequency range, the target frequency range comprising a frequency range not included in a frequency range of the audio signal.*

*23. The method according to claim 20, further comprising:*

*scaling the spectral values by a factor, wherein the factor depends on an overlap add characteristic in that a relation of a first time distance for an overlap-add applied by the windower and a different time distance applied by the overlap adder and a window characteristics is accounted for.*

*24. The method according to claim 20, further comprising:*

*removing samples at time positions of the modified time domain audio signal, the time positions corresponding to the specified time positions applied by the windower.*

*25. The method according to claim 24, in which the windower is configured for symmetrically inserting the padded values before the first sample of the consecutive block of audio samples and after the last sample of the consecutive block of audio samples, so that the padded block is adapted to a conversion by the first converter and the second converter.*

*26. The method according to claim 20, the method being configured for performing a bandwidth extension algorithm, the bandwidth extension algorithm comprising a bandwidth extension factor, the bandwidth extension factor controlling a frequency shift between a band of the audio signal and a target frequency band, wherein the phase modifier is configured to scale phases of spectral values of the band of the audio signal by the bandwidth extension factor, so that at least one sample of a consecutive block of audio samples is cyclically convolved into a block.*

*27. The method according to claim 20, wherein the windower comprises:*

*using a padder configured for inserting the padded values at the specified time positions before the first sample of the consecutive block of audio samples or after the last sample of the consecutive block of audio samples, the method further comprising:*

*using a switch which is controlled by the transient detector, wherein the switch is configured to control the padder so that the padded block is generated when a transient event is detected by the transient detector, the padded block comprising the padded values and the audio signal values, and to control the padder, so that a non-padded block is generated when the transient event is not detected by the transient detector, the non-padded block comprising audio signal values only,*

*wherein the first converter comprises a first sub-converter and a second sub-converter, and*

*wherein the switch is furthermore configured to feed the padded block to the first sub-converter to perform a conversion comprising a first conversion length when the transient event is detected by the transient detector and to feed the non-padded block to the second sub-converter to perform a conversion comprising a second conversion length being shorter than the first conversion length when the transient event is not detected by the transient detector.*

*28. The method according to claim 20, wherein the windower comprises an analysis window processor configured for applying an analysis window function to a consecutive block of audio samples, the analysis window processor being controllable so that the analysis window function comprises a guard zone at a start position of the analysis window function or an end position of the analysis window function, the method further comprising:*

*using a guard window switch which is controlled by the transient detector, wherein the guard window switch is configured to control the analysis window processor, so that the padded block is generated from a consecutive block of audio samples by use of the analysis window function comprising the guard zone, the padded block comprising the padded values and the audio signal values when a transient event is detected by the transient detector, and to control the analysis window processor, so that a non-padded block is generated, the non-padded block comprising the audio signal values only, when the transient event is not detected by the transient detector,*

*wherein the first converter comprises a first sub-converter and a second sub-converter, and*

*wherein the guard window switch is furthermore configured to feed the padded block to the first sub-converter to perform a conversion comprising a first conversion length when a transient event is detected by the transient detector and to feed the non-padded block to the second sub-converter to perform a conversion comprising a second conversion length being shorter than the first conversion length when the transient event is not detected by the transient detector.*

* * * * *